US008376831B2

(12) United States Patent
Hedrick et al.

(10) Patent No.: US 8,376,831 B2
(45) Date of Patent: Feb. 19, 2013

(54) GAMING MACHINE HAVING SECONDARY DISPLAY FOR PROVIDING VIDEO CONTENT

(75) Inventors: Joseph R. Hedrick, Reno, NV (US); Robert A. Luciano, Jr., Reno, NV (US); Jean Pierre Legras, Carson City, NV (US); Chauncey W. Griswold, Reno, NV (US); Don C. Stephan, Carson City, NV (US)

(73) Assignee: IGT, Reno, NV (US)

( * ) Notice: Subject to any disclaimer, the term of this patent is extended or adjusted under 35 U.S.C. 154(b) by 113 days.

(21) Appl. No.: 12/459,355

(22) Filed: Jun. 29, 2009

(65) Prior Publication Data

US 2010/0113146 A1 May 6, 2010

Related U.S. Application Data

(63) Continuation of application No. 10/817,625, filed on Apr. 1, 2004, which is a continuation of application No. 08/910,924, filed on Aug. 8, 1997, now Pat. No. 6,135,884.

(51) Int. Cl.

| | |
|---|---|
| ***A63F 13/08*** | (2006.01) |
| ***A63F 13/12*** | (2006.01) |
| ***G07F 17/34*** | (2006.01) |

(52) U.S. Cl. ................ 463/20; 463/46; 463/25; 463/26; 463/27; 463/42; 463/40; 463/12; 273/143 R; 273/138.2

(58) Field of Classification Search .................... 463/20, 463/46, 12, 13, 16–19, 25–27, 40; 273/138.2, 273/138.1, 143 R, 309

See application file for complete search history.

(56) References Cited

U.S. PATENT DOCUMENTS

| | | | |
|---|---|---|---|
| 4,072,930 | A | 2/1978 | Lucero et al. |
| 4,283,709 | A | 8/1981 | Lucero et al. |
| 4,339,798 | A | 7/1982 | Hedges et al. |

(Continued)

FOREIGN PATENT DOCUMENTS

| | | |
|---|---|---|
| AU | 702972 | 8/1996 |
| AU | 704691 | 4/1997 |

(Continued)

OTHER PUBLICATIONS

Office Action dated Sep. 13, 2005 issued in U.S. Appl. No. 10/817,625.

(Continued)

*Primary Examiner* — Benjamin Layno

(74) *Attorney, Agent, or Firm* — Weaver Austin Villeneuve & Sampson LLP

(57) ABSTRACT

A gaming machine includes main and secondary displays. The secondary display is disposed apart from the primary display and is used for presenting primary, secondary, or even tertiary information. The main display is controlled electronically by a gaming machine controller, which main display presents the results of a play on the gaming machine. In the case of a slot machine, the main display may be the glass display through which the spinning reels of a game play are viewed. In a video poker gaming machine, the main display is usually a cathode ray tube ("CRT") which displays a video game image to the player and other information directly associated with the game play. The secondary display may be provided at various locations on the gaming machine such as in a top glass portion of the gaming machine or a belly glass portion of the gaming machine, which belly glass portion is located below a main display portion of the gaming machine. The secondary display itself may be a liquid crystal display, a cathode ray tube, a field emission display, a plasma display, a digital micromirror device (DMD), etc.

28 Claims, 19 Drawing Sheets

U.S. PATENT DOCUMENTS

| | | | | | |
|---|---|---|---|---|---|
| 4,517,558 | A | | 5/1985 | Davids | |
| 4,553,222 | A | | 11/1985 | Kurland et al. | |
| 4,718,672 | A | | 1/1988 | Okada | |
| 4,824,121 | A | | 4/1989 | Beall et al. | |
| 4,838,552 | A | | 6/1989 | Hagiwara | |
| 4,856,787 | A | | 8/1989 | Itkis | |
| 4,991,848 | A | | 2/1991 | Greenwood et al. | |
| 5,042,809 | A | | 8/1991 | Richardson | |
| 5,127,651 | A | | 7/1992 | Okada | |
| 5,178,390 | A | | 1/1993 | Okada | |
| 5,179,517 | A | | 1/1993 | Sarbin et al. | |
| 5,186,460 | A | | 2/1993 | Fongeallaz et al. | |
| 5,259,613 | A | * | 11/1993 | Marnell, II | 463/42 |
| 5,265,874 | A | | 11/1993 | Dickinson et al. | |
| 5,321,241 | A | | 6/1994 | Craine | |
| 5,326,104 | A | | 7/1994 | Pease et al. | |
| 5,342,047 | A | | 8/1994 | Heidel et al. | |
| 5,371,345 | A | | 12/1994 | LeStrange et al. | |
| 5,375,830 | A | | 12/1994 | Takemoto et al. | |
| 5,393,057 | A | * | 2/1995 | Marnell, II | 463/13 |
| 5,429,361 | A | | 7/1995 | Raven et al. | |
| 5,457,306 | A | | 10/1995 | Lucero | |
| 5,470,079 | A | | 11/1995 | LeStrange et al. | |
| 5,515,959 | A | | 5/1996 | Stephenson, III et al. | |
| 5,542,669 | A | | 8/1996 | Charron et al. | |
| 5,548,348 | A | | 8/1996 | Kawabata | |
| 5,560,603 | A | | 10/1996 | Seelig et al. | |
| 5,564,700 | A | | 10/1996 | Celona | |
| 5,619,738 | A | | 4/1997 | Petruchik et al. | |
| 5,630,753 | A | | 5/1997 | Fuchs | |
| 5,643,086 | A | | 7/1997 | Alcorn et al. | |
| 5,647,798 | A | * | 7/1997 | Falciglia | 463/19 |
| 5,655,961 | A | | 8/1997 | Acres et al. | |
| 5,664,998 | A | | 9/1997 | Seelig et al. | |
| 5,697,843 | A | | 12/1997 | Manship et al. | |
| 5,722,891 | A | | 3/1998 | Inoue | |
| 5,725,428 | A | | 3/1998 | Achmuller | |
| 5,741,183 | A | | 4/1998 | Acres et al. | |
| 5,761,647 | A | | 6/1998 | Bouchy | |
| 5,770,533 | A | * | 6/1998 | Franchi | 463/42 |
| 5,788,573 | A | * | 8/1998 | Baerlocher et al. | 463/16 |
| 5,796,389 | A | | 8/1998 | Bertram et al. | |
| 5,833,540 | A | | 11/1998 | Miodinski et al. | |
| 5,851,148 | A | | 12/1998 | Brune et al. | |
| 5,902,983 | A | | 5/1999 | Crevelt et al. | |
| 5,919,088 | A | | 7/1999 | Weiss | |
| 5,919,091 | A | | 7/1999 | Bell et al. | |
| 5,947,820 | A | | 9/1999 | Morro et al. | |
| 5,951,397 | A | | 9/1999 | Dickinson | |
| 5,971,271 | A | | 10/1999 | Wynn et al. | |
| 5,971,849 | A | | 10/1999 | Falciglia | |
| 5,984,780 | A | | 11/1999 | Takemoto et al. | |
| 5,999,808 | A | | 12/1999 | LaDue | |
| 6,003,013 | A | | 12/1999 | Boushy et al. | |
| 6,012,982 | A | | 1/2000 | Piechowiak et al. | |
| 6,024,640 | A | * | 2/2000 | Walker et al. | 463/17 |
| 6,029,973 | A | | 2/2000 | Takemoto et al. | |
| 6,039,648 | A | | 3/2000 | Guinn et al. | |
| 6,048,269 | A | | 4/2000 | Burns et al. | |
| 6,071,190 | A | | 6/2000 | Weiss et al. | |
| 6,089,975 | A | | 7/2000 | Dunn | |
| 6,089,979 | A | | 7/2000 | Klein | |
| 6,104,815 | A | | 8/2000 | Alcorn et al. | |
| 6,106,396 | A | | 8/2000 | Alcorn et al. | |
| 6,110,041 | A | | 8/2000 | Walker et al. | |
| 6,113,495 | A | | 9/2000 | Walker et al. | |
| 6,135,884 | A | | 10/2000 | Hedrick et al. | |
| 6,149,522 | A | | 11/2000 | Alcorn et al. | |
| 6,161,059 | A | | 12/2000 | Tedesco | |
| 6,162,122 | A | | 12/2000 | Acres et al. | |
| 6,183,362 | B1 | | 2/2001 | Boushy | |
| 6,190,256 | B1 | | 2/2001 | Walker et al. | |
| 6,210,279 | B1 | | 4/2001 | Dickinson | |
| 6,227,972 | B1 | | 5/2001 | Walker et al. | |
| 6,244,958 | B1 | | 6/2001 | Acres | |
| 6,247,643 | B1 | | 6/2001 | Lucero | |
| 6,253,119 | B1 | | 6/2001 | Dabrowski | |
| 6,264,560 | B1 | | 7/2001 | Goldberg et al. | |
| 6,267,671 | B1 | | 7/2001 | Hogan | |
| 6,280,328 | B1 | | 8/2001 | Holch et al. | |
| 6,307,956 | B1 | | 10/2001 | Black | |
| 6,315,666 | B1 | | 11/2001 | Mastera et al. | |
| 6,341,353 | B1 | | 1/2002 | Herman et al. | |
| 6,368,216 | B1 | | 4/2002 | Hedrick et al. | |
| 6,371,852 | B1 | | 4/2002 | Acres | |
| 6,379,246 | B1 | | 4/2002 | Dabrowski | |
| 6,383,076 | B1 | | 5/2002 | Tiedeken | |
| 6,409,595 | B1 | | 6/2002 | Uihlein et al. | |
| 6,443,843 | B1 | | 9/2002 | Walker et al. | |
| 6,476,798 | B1 | | 11/2002 | Bertram | |
| 6,712,698 | B2 | | 3/2004 | Paulsen et al. | |
| 2003/0050117 | A1 | | 3/2003 | Silva et al. | |
| 2010/0113146 | A1 | | 5/2010 | Hedrick et al. | |

FOREIGN PATENT DOCUMENTS

| | | |
|---|---|---|
| AU | 710015 | 9/1997 |
| AU | 686824 | 2/1998 |
| AU | 697582 | 2/1998 |
| AU | 733963 | 9/1998 |
| AU | 748263 | 11/1998 |
| AU | 75729/98 | 12/1998 |
| CA | 2197448 | 11/1996 |
| EP | 0 534 718 | 3/1993 |
| EP | 0 769 769 | 4/1997 |
| EP | 0 886 250 | 12/1998 |
| EP | 0 698 858 | 4/2002 |
| EP | 0 919 965 | 1/2005 |
| GB | 2 072 395 | 9/1981 |
| GB | 2 083 936 | 3/1982 |
| GB | 2 106 685 | 4/1983 |
| GB | 2 157 047 | 10/1985 |
| GB | 2 170 938 | 8/1986 |
| GB | 2 181 589 | 4/1987 |
| GB | 2 182 186 | 5/1987 |
| GB | 22303773 | 10/1990 |
| GB | 2 262 642 | 6/1993 |
| GB | 2 192 478 | 1/1998 |
| JP | 55-80980 | 11/1978 |
| JP | 63-24970 | 2/1988 |
| JP | 64-58287 | 3/1989 |
| JP | 4-183484 | 6/1992 |
| JP | 67498 | 1/1994 |
| JP | 6-35066 | 2/1994 |
| JP | 6-63247 | 3/1994 |
| JP | 8-304911 | 11/1996 |
| JP | 9122296 | 5/1997 |
| WO | WO 95/30944 | 11/1995 |
| WO | 98/52664 | 11/1998 |
| WO | 99/10061 | 3/1999 |
| WO | 02/058020 | 7/2002 |

OTHER PUBLICATIONS

Office Action dated Jun. 18, 2010 issued in U.S. Appl. No. 10/817,625.

*Ex Parte Quayle* Office Action dated Dec. 9, 2010 issued in U.S. Appl. No. 10/817,625.

Office Action dated Nov. 3, 2011 issued in U.S. Appl. No. 10/817,625.

European Oral Proceedings dated Oct. 4, 2007 issued in EP Application No. 98111287.3 12 pgs.

Brazilian Office Action mailed Feb. 10, 2009 issued in Application No. PI9806529-7.

Brochure for "Dual Screen Players Edge Plus Keno Machine from International Game Technology," released prior to Aug. 1997.

Statement of Grounds and Particulars in Support of Opposition, Appl No. 755826 (78853/98), 5 page document, Australia Patents Act 1990.

Decision of a Delegate of the Commissioner of Patents, Appl No. 744026, 15 page document, International Game Technology and Opposition thereto by Aristocrat Technologies Australia PTY Ltd.

Withdrawal of Opposition, Appl. No. 755826, 1 page correspondence from IP Austrialia, In the name of International Game Technology, and Request under Section 32 by Acres Gaming, Inc./.

Communication of a Notice of Opposition, Appl No. 98111287.3-2221/0896308, 19 pages, European Patent Office.

In the Opposition to Patent Application No. 744026, 41 page document entitled, "Gaming Device Security System: Apparatus and Method" (Exhibit LGG-4).
In the Opposition to Patent Application No. 744026, 64 page document entitled, "Gaming Machines Having Secondary Display for Providing Video Content" (Exhibit LGG-1).
In the Opposition to Patent Application No. 744026, 32 page document entitled, "Gaming Device Security System: Apparatus and Method" (Exhibit LG-3, WO 98/52664).
Abstract of Australian Appl. No. 69758, 1 page document entitled, "Computer Network for Controlling and Monitoring Gaming Devices".
Statement of Grounds and Particulars Relating to Each Ground, Appl No. 744026, 10 page document entitled, "Gaming Machines Having Secondary Display for Proving Video".
Advertisement for Ultra Poker Machine, Australian Appl No. 744026, 3 page document entitled, "Gaming Machines Having Secondary Display for Providing Video" (Exhibit LGG-5).
Statutory Declaration, Appl No. 744026, 17 page document entitled, "Gaming Machines Having Secondary Display for Providing Video" Australia Patents Act 1990.
Brochure inside Indian Gaming Magazine, Mar. 1996, 3 page document (Exhibit LGG-6).
U.S. Office Action dated Jul. 21, 1998 issued in U.S. Appl. No. 08/910,924.
U.S. Office Action dated Jan. 14, 1999 issued in U.S. Appl. No. 08/910,924.
U.S. Office Action dated Jun. 6, 1999 issued in U.S. Appl. No. 08/910,924.
U.S. Final Office Action dated Feb. 3, 2000 issued in U.S. Appl. No. 08/910,924.
U.S. Notice of Allowance dated May 25, 2000 issued in U.S. Appl. No. 08/910,924.
U.S. Office Action dated Jan. 16, 2001 issued in U.S. Appl. No. 09/615,968.
U.S. Final Office Action dated Jun. 15, 2001 issued in U.S. Appl. No. 09/615,968.
U.S. Notice of Allowance dated Sep. 5, 2001 issued in U.S. Appl. No. 09/615,968.
U.S. *Ex Parte Quayle* Office Action dated May 26, 2006 issued in U.S. Appl. No. 10/817,625.
U.S. Petition Decision dated Jun. 21, 2007 issued in U.S. Appl. No. 10/817,625.
U.S. Office Action dated Jul. 28, 1999 issued in U.S. Appl. No. 08/911,254.
U.S. Final Office Action dated Apr. 4, 2000 issued in U.S. Appl. No. 08/911,254.
U.S. Office Action dated Aug. 4, 1999 issued in U.S. Appl. No. 08/907,604.
U.S. Final Office Action dated Mar. 27, 2000 issued in U.S. Appl. No. 08/907,604.
U.S. Office Action dated Dec. 27, 2000 issued in U.S. Appl. No. 08/907,604.
U.S. Notice of Allowance dated Jun. 13, 2001 issued in U.S. Appl. No. 08/907,604.
Argentine First Office Action dated May 28, 1999 issued in AR 98 01 03652.
Australian Examiner's first report dated Feb. 16, 2001 issued in AU 78858/98.
Canadian Office Action dated Apr. 8, 2002 issued in CA 2,238,676.
European Search Report dated Nov. 13, 1998 issued in EP Application No. 98 111 287.3.
European Examination Report dated Dec. 8, 2000 issued in EP Application No. 98 111 287.3-2207.
European Communication of notices of opposition (R. 57(1) EPC) dated Aug. 16, 2004 issued in 98 111 287.3-2221/0896308, 2pp.
European Brief Communication dated Jan. 13, 2005 issued in Application No. 98 111 287.3-2221/0896308, 19pp.
European Withdrawal of Opposition dated Mar. 19, 2008 issued in EP Application No. 98 111 287.3, 1 p.
European Interlocutory decision in Opposition proceedings dated Apr. 9, 2008 issued in EP Application No. 98 111 287.3.
European Search Report dated Oct. 16, 2003 issued in EP 03 01 7791.
Japanese Office Action dated Sep. 14, 1999 issued in JP 222867/98.
Japanese Final Rejection dated Apr. 24, 2001 issued in JP 222867/98.
Japanese Notice of Decision dated Sep. 16, 2005 issued in JP 222867/98.
Argentine Office Action dated Jan. 4, 2007 issued in AR P98 01 03650.
Australian letter of description re Examiner's first report dated Feb. 26, 2001 issued in AU 78853/98 (755826).
Australian Examiner's report No. 2 dated Mar. 19, 2002 issued in AU 78853/98 (755826).
Australian letter re Notice of Opposition dated Mar. 19, 2003 issued in AU 78853/98 (755826).
Australian Examiner's first report dated Jan. 29, 2003 issued in AU 26114/02.
Australian Examiner's first report dated Oct. 11, 2006 issued in AU 2004222841.
Australian Examiner's first report dated Aug. 24, 2009 issued in AU 2008201747.
Brazilian Office Action dated Feb. 10, 2009 issued in Application No. PI 9806530-0.
European Search Report dated Jun. 19, 2000 issued in EP 98 111 289.9-2221.
European Examination Report dated Jan. 25, 2005 issued in EP 98 111 289.9-2221.
Argentine Office Action dated May 7, 1999 issued in AR P98 01 03651.
Australian Examiner's first report dated Jun. 19, 2001 issued in AU 78857/98.
Australian Decision to Dismiss Opposition dated Feb. 6, 2004 issued in AU 744026 (78857/98), 1 page.
Canadian Office Action dated Feb. 3, 2003 issued in CA 2,238,959.
European Search Report dated Jun. 19, 2000 issued in EP 98 111 288.1-2207.
European Examination dated Jan. 25, 2005 issued in EP 98 111 288.1-2207.
European Examination dated Jul. 25, 2005 issued in EP 98 111 288.1-2207.
European Extended Search Report and Search Opinion dated Jul. 30, 2008 issued in EP 07 024 841.4.
European Extended Search Report dated Jul. 22, 2008 issued in EP 07 024 840.6.

* cited by examiner

GAMING MACHINE HAVING SECONDARY DISPLAY FOR PROVIDING VIDEO CONTENT

CROSS REFERENCE TO RELATED APPLICATIONS

This application is a continuation of U.S. patent application Ser. No. 10/817,625, filed on Apr. 1, 2004, entitled GAMING MACHINE HAVING SECONDARY DISPLAY FOR PROVIDING VIDEO CONTENT, which is a reissue of U.S. patent application Ser. No. 09/615,968, filed on Jul. 14, 2000, entitled GAMING MACHINE HAVING SECONDARY DISPLAY FOR PROVIDING VIDEO CONTENT, now U.S. Pat. No. 6,368,216, which is a continuation of U.S. patent application Ser. No. 08/910,924, filed on Aug. 8, 1997, entitled GAMING MACHINE HAVING SECONDARY DISPLAY FOR PROVIDING VIDEO CONTENT, now U.S. Pat. No. 6,135,884. This application is related to U.S. patent application Ser. No. 08/911,254, entitled GAMING MACHINES PROVIDING BONUS GAMES, naming Bittman, et al. as inventors, and filed on the same day as the instant patent application. This application is also related to U.S. patent application Ser. No. 08/907,604, entitled GAMING MACHINES HAVING SECONDARY DISPLAY FOR PROVIDING VIDEO CONTENT, naming Mastera, et al. as inventors, and filed on the same day as the instant patent application. Both of the above documents are incorporated herein by reference for all purposes.

BACKGROUND OF THE INVENTION

This invention relates to gaming machines such as slot machines. More particularly, the present invention relates to gaming machines having a main display for presenting primary game play aid outcome information and a secondary display, which is a video display, for displaying secondary information.

Gaming machines such as slot machines and video poker machines are becoming increasingly popular. Part of the reason for their increased popularity is the nearly endless variety of games that can be implemented on the gaming machine. Recently, "secondary game events" have been provided as a variation on some gaming machines. As used herein, "primary game information" includes, for example, information about numerous stages of game play such as (1) a "currency in" stage in which the machine awaits a coin or bill insertion to initiate a play, (2) a "game play" stage in which the player has initiated a play (e.g., spinning reels on a slot machine), and (3) a "game result" stage in which a payout or no-payout event is registered. Other primary events include general gaming machine state changes such as malfunction (e.g., a tilt). As used herein "secondary game information" includes information about slot tournaments, progressive games, bonusing schemes, and other incentives for maintaining a player's interest or to play in a particular manner. In one example, a progressive game allows jackpots to be pooled over multiple slot machines. At some location, die sum of the pooled jackpot (secondary information) is displayed to players and potential players.

Each of the primary game events results in displayed information, conventionally presented to the gaming machine user via a main display (e.g., the reels display in a slot machine or the CRT in a video poker game). Some primary game information may also be displayed via light source regions that light up on the gaming machine glass when a particular primary game event occurs. The secondary information may also be displayed via such lighted regions on the gaming machine glass. Unfortunately, the potential of secondary games has been largely unrealized because the display vehicle for secondary game events (lights or sounds emanating from the gaming machine) greatly limits the attraction and sophistication of such games. Sometimes, as in the case of progressive slot games, the secondary information is presented in a large specially created display occupying significant space in a central location of the casino.

FIG. 1 is a perspective view of a conventional reel-type slot machine 10. It includes a slot machine exterior housing 12 and a front face including a top glass 14, a main display 16, and a belly glass 18. Main display 16 includes windows 38, 40, and 42 each of which display a single spinning reel of the slot machine. Horizontal pay lines 44 span the windows and allow for multiple winning combinations. Top glass 14 and belly glass 18 typically contain printed information conveying various thematic or instructive details about gaming machine 10. Glasses 14 and 18 are also typically backlit so that information printed on them is readily visible to gaming machine players. In addition, separate light region 15*a* within main display 16 presents primary game information such as coin insert events (e.g., an 8 segment LED meter will increase its count in region 15*a* in response to a player inserting a coin or a bill into bill acceptor 24). Utility meters or lighted displays 46*a* and 46*b* could also be used for limited display of secondary game information. Player buttons 20 are provided between belly glass 18 and main display 16 and allow the player to control operation of gaming machine 10. A coin acceptor 22 and a bill acceptor 24 are provided near the play buttons as shown. Finally, a coin tray 28 is provided near the bottom of slot machine 10 to collect coin pay outs from winning plays.

To the extent that secondary information can be provided in a gaming machine such as slot machine 10, that information is limited to the utility meters 46*a* and 46*b* or other simple display mechanisms such as back lit symbols or other representations. Wheels and other simple mechanical indicators have also been used previously such as the configuration that is the subject of a U.S. patent application Ser. No. 08/620,586, assigned to International Game Technology.

It should be understood that creating and applying the artwork on top glass 14 and belly glass 18 is a very resource intensive task. Workers silk screen the artwork onto the glass by a very carefully controlled process. The quality of the silk screen process must be very high to ensure that pin holes or other defects in the painted areas are not present. This is because the displays are backlit such that light shines through the glass. Any pin holes or other defects would be immediately apparent to the gaming machine player.

A given gaming machine may have its silk screened glasses replaced multiple times during its life. This is because most gaming machines installed in a casino are regularly retrofitted to provide fresh appeal to potential gaming machine players and to maintain or increase a player's interest or desire to play a particular game. This retrofit typically involves replacing the top glass 14, belly glass 18, reel strips (on a spinning reel slot machine), and new firmware to provide an update or new game for a previously owned machine. Such retrofitting represents a significant expense to the casino. First, as explained, the new glass must be manufactured via the expensive silk screen process. Gaming machine companies must maintain graphic artists and silk screen artists on-site to generate new designs and the new glass. In fact, companies commonly find that one third of their graphic artists' time is devoted to generating glass for retrofitting. In addition, the company must devote service personnel to install the fresh glass. Finally, and most importantly, firmware engineers must design new firmware that runs on the machine corresponding to the new reel strips and game theme.

In view of the above observations, it would be desirable to provide a gaming machine allowing the potential of secondary game events to be realized such that the machine can be easily modified with new games or features that can maintain or increase a player's interest or desire to play a particular game. In addition, it would be desirable to reduce the costliness and inconvenience of updating thematic displays on gaming machine glass. What is needed therefore is an improved apparatus and method for controlling the content of various necessary displays in a gaming machine for both primary and secondary game events, as well as other new applications.

SUMMARY OF THE INVENTION

The present invention provides gaming machines and methods of using gaming machines in which a gaming machine includes both a main or primary display for displaying the outcome of a primary game and a secondary display for presenting primary, secondary, or even "tertiary information." Tertiary information as used herein refers to information that is not directly related to the play of a primary or secondary game. Tertiary information includes, for example, billboard information, advertisements, television programming, and player attraction animations. In some cases, the video display may serve as a substitute for displaying some or all of the information currently provided on the top glass or belly glass on a conventional slot machine. Regardless of where the video display is located and how much space it occupies, it may introduce substantial flexibility in presenting primary and secondary information to actual and potential players.

Preferably, the secondary display is a video display. In the case of a slot machine, the main display may be the glass window through which the spinning reels of a game play is viewed. In a video poker gaming machine, the main display is usually a cathode ray tube ("CRT") which displays the cards dealt to the player and other information directly associated with the game play. To the extent that the present invention is deployed in video poker and related video games, the secondary display refers to a separate display disposed away from the main display.

In accordance with one aspect of the invention, a gaming machine may be characterized as including the following features: (1) a chassis defining a gaming machine interior region and a gaming machine exterior; (2) a gaming machine controller for controlling the outcome of a primary game played on the gaming machine; (3) a main display capable of presenting the outcome of a primary game play on the gaming machine; (4) a secondary display, which is a flat panel display, provided on the gaming machine at a location disposed apart from the main display and displaying video content. Preferably, the gaming machine also includes (5) a secondary display support on which the secondary display is mounted, the secondary display support being attached to the gaming machine chassis by a hinge which allows the secondary display to be moved from (a) an operating position in which at least a portion of the gaming machine interior is blocked to (b) a maintenance position in which the portion is accessible. The secondary display may be provided at various locations on the gaming machine. For example, it may be provided in a top box portion of the gaming machine, which top box portion is located above the main display portion of the gaming machine. It may also be placed in a belly portion which is located below a main display portion of the gaming machine.

In a preferred embodiment, the secondary display support includes a casing which encloses one or more memory devices, preferably flash memory devices. These memory devices may store animation data for display on the secondary display. The memory may be PCMCIA cards and the support may include one or more slots for inserting these cards—thereby updating the memory.

Often, the gaming machine will be a stepper driven slot machine with the main display comprising a set of spinning reels. The secondary display may be a flat panel cathode ray tube, a liquid crystal display, a plasma display, a field emission display, a digital micromirror display, an LCD touchscreen, etc. The video content displayed on the secondary display may be, for example, a casino kiosk, television programming, primary game outcome information, player attraction material, video conferencing, casino service notification and combinations thereof. In a particularly preferred embodiment, the video content is a secondary game including a bonusing game or a bonusing component to a primary game. The bonusing component awards player with playing credits and/or increased jackpots.

Another component of many gaming machines of this invention is a gaming machine controller provided within the gaming machine and controlling the video content displayed on the video display. The same controller may also control the outcome of the primary game played on the gaming machine. To supplement the video content displayed on the secondary screen, one or more speakers may be provided for generating sound.

In another aspect, the present invention provides a method of using a gaming machine such as that described above. Such method may be characterized as including the following steps: (a) displaying video content to a gaming machine player on the secondary display; (b) in response to a player initiating a play on the gaming machine, presenting the results of the play on the main display of the gaming machine. The method may also include (c) moving the secondary display support from an operating position in which at least a portion of the gaining machine interior is blocked to a maintenance position in which the portion is accessible. The method may also include a step of accessing data stored on a memory device provided within the secondary display support. The accessed data so accessed may be used to display the video content on the secondary display.

These and other features of the present invention will be presented in more detail in the following detailed description of the invention and the associated figures.

DESCRIPTION OF THE PREFERRED EMBODIMENTS

General

Generally, the present invention provides improved gaining machines and methods of using such improved gaming machines. While the invention is described in terms of a few specific embodiments, it is by no means so limited. Numerous specific details of these embodiments are set forth in order to provide a thorough understanding of the present invention. It will be apparent, however, that the present invention may be practiced without limitation to some of the specific details presented herein.

Figure 1:
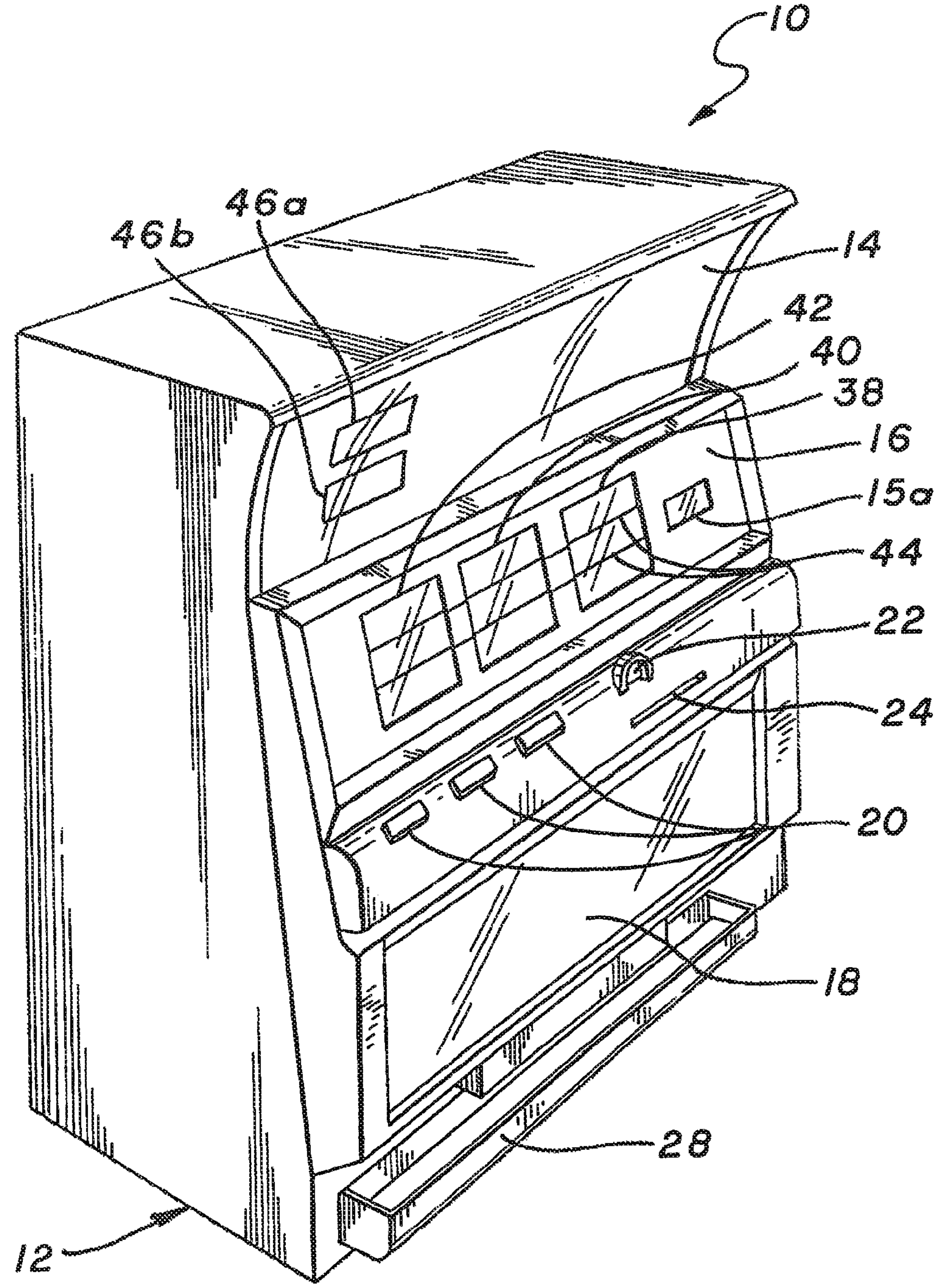
FIG. 1 is a perspective view of a conventional slot machine.
Figure 2:
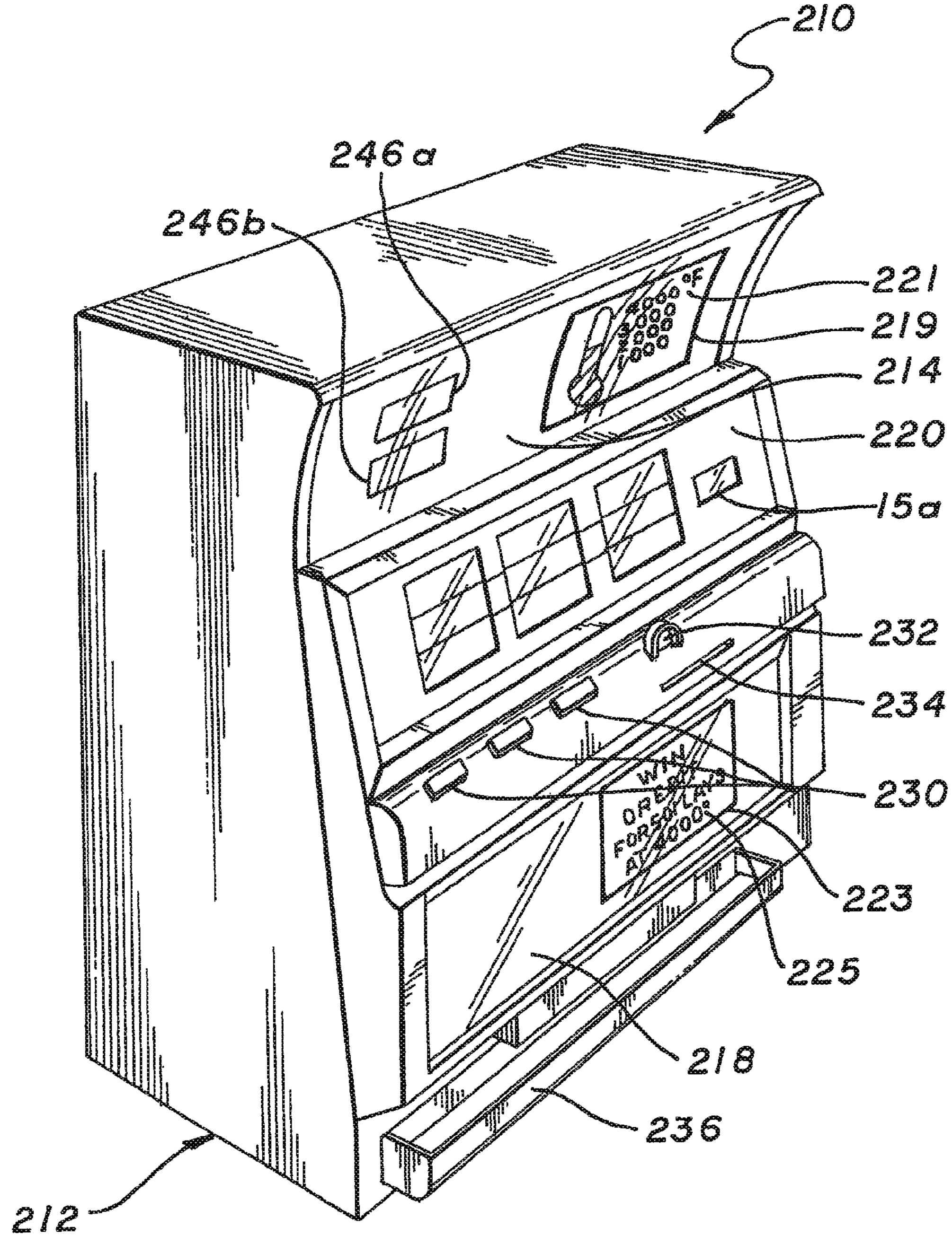
FIG. 2 is a perspective view of a slot machine containing a video display in accordance with one embodiment of the present invention.

A video display gaming machine 210 provided in accordance with one embodiment of this invention is depicted in FIG. 2. Gaming machine 210 includes a gaming machine housing 212, a top glass 214, a belly glass 218, and a main display 220. Main display 220 may be a mechanical display such as a spinning reel display or a video display such as a CRT. Examples of games for which the results of a play may be displayed on a main video display include video slot games, electronic video poker card games, electronic keno games, electronic blackjack games, spinning reel slot games, etc. A spinning reel display includes a set of spinning reels which are typically stepper motor driven reel assemblies that each include a plurality of indicia or symbols on their periphery. If the indicia on the reels line up in a predetermined combination, the player is paid a jackpot.

Mounted within top glass 214 is a top glass secondary video display 219 which provides video content 221 such as secondary game information as described above. In the example presented, video content 221 includes a thermometer indicating how close the machine has come to awarding a bonus. Also, mounted within top glass 214 are separate utility meters or lighted display regions 246*a* and 246*b* which may present primary and secondary game information as described above. It is also possible, although not necessarily preferred, to mount within belly glass 218 a belly glass video display 223 providing video content 225 such as player attraction material indicating that a bonus is available. The video displays 221 and 223 are preferably high-resolution flat panel LCDs, cathode ray tubes, projection type LCDs, plasma displays, field emission displays, a digital micromirror device (DMD) or other conventional electronically controlled video monitors.

Provided beneath main display 220 are various play buttons 230 which allow the user to control operation of the gaming machine in a conventional manner. The control buttons 230 allow the gaming machine user to select various games and/or game options. Many possible games including traditional slot games, progressive slot games, video poker, and increasingly popular multi-line machines which have multiple (e.g., 8 or 15) pay lines. Of course, the arrangement and function of control buttons 230 will depend somewhat upon the type of game (or games) that can be played on machine 210. For multi-game machine formats, such as IGT's Game King Machine, buttons 230 may have more than one function depending on the available games.

A coin acceptor 232 and a bill acceptor 234 are provided for accepting player currency to allow plays on gaming machine 210. Finally, a coin tray 236 is provided beneath belly glass display 218 to collect coins from winning plays. When a user wishes to play the gaming machine 212, he or she inserts cash or coin through bill insertion slot 234 or coin slot 232.

Gaming machine 210 may also include player tracking apparatus (not shown) which could include a key pad, a player tracking card reader, and a small display. As explained in related application U.S. Ser. No. 08/639,762, naming Crevelt et al. as inventors, filed Apr. 29, 1996, and assigned to the assignee of the present application, player tracking is commonly used by casinos to understand the usage patterns of various of its patrons. The Ser. No. 08/639,762 application is incorporated herein by reference for all purposes.

In one preferred embodiment of the present invention, a secondary display is provided in the top portion of a gaming machine. That entire portion will be referred to herein as a "top box." The top box is preferably a modular portion of the gaming machine which can be removed and reinstalled as necessary. This allows easy servicing, replacement, and upgrading.

FIGS. 3*a*-3*e* and 4*a*-4*d* illustrate two alternative embodiments of a gaming machine top box designed in accordance with the present invention. It should be understood that the top boxes illustrated in FIGS. 3*a*-3*e* and 4*a* are normally mounted on top of the remainder of the gaming machine chassis, including a main display region and a belly glass region. In FIGS. 3*a*-3*e*, the top box has a rectangular profile, while in FIGS. 4*a*-4*d*, the top box has a rounded or more dome-shaped profile. In each case, the secondary display and some associated electronics are provided in a module which is affixed to the top box by a hinge. In addition, a top glass with an associated viewing window for a secondary display is provided on the front exterior of each top box design.

Figure 3A:
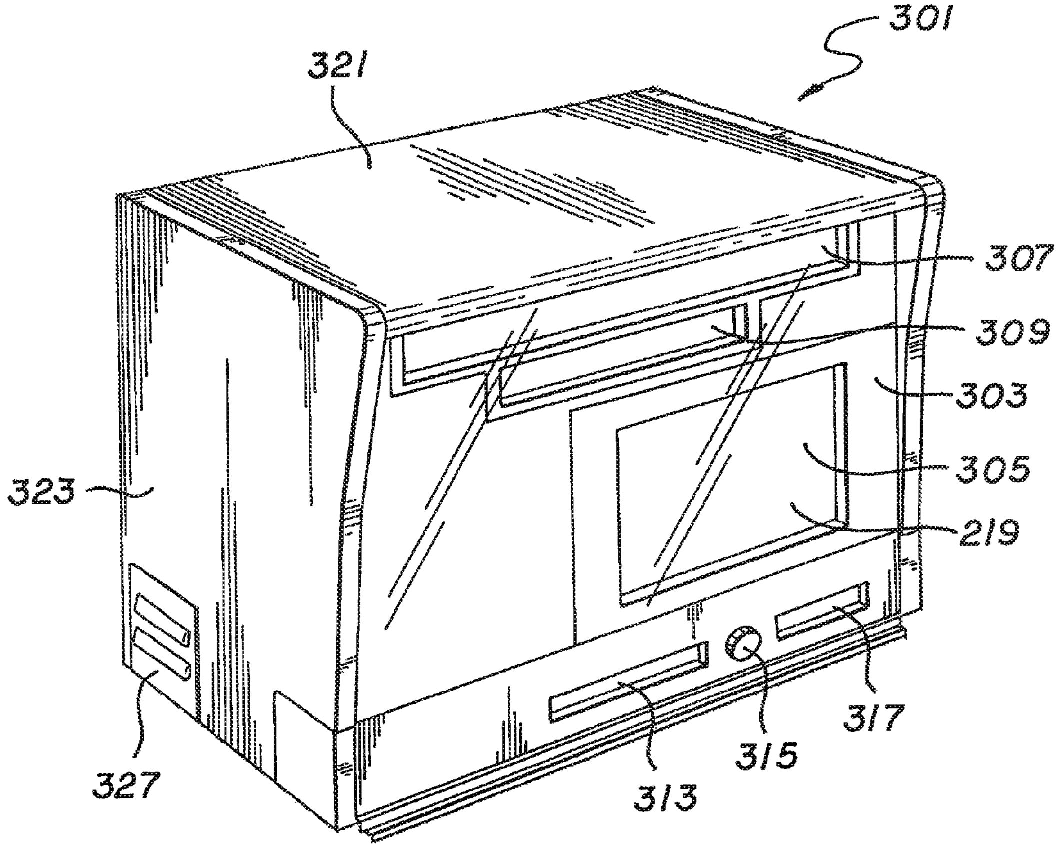
FIGS. 3*a*-3*c* are perspective, front and top views of a rectangular profile slot machine top box in accordance with a preferred embodiment of the present invention.
Figure 3B:
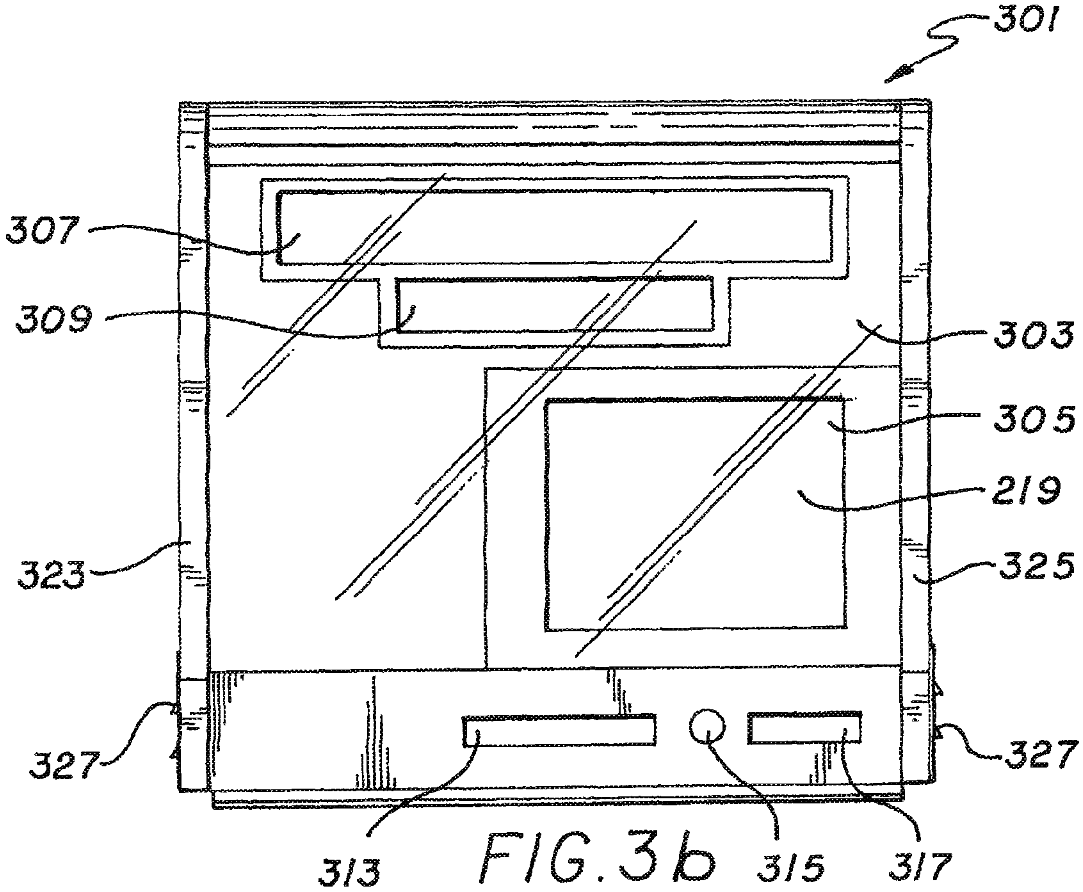
Figure 3C:
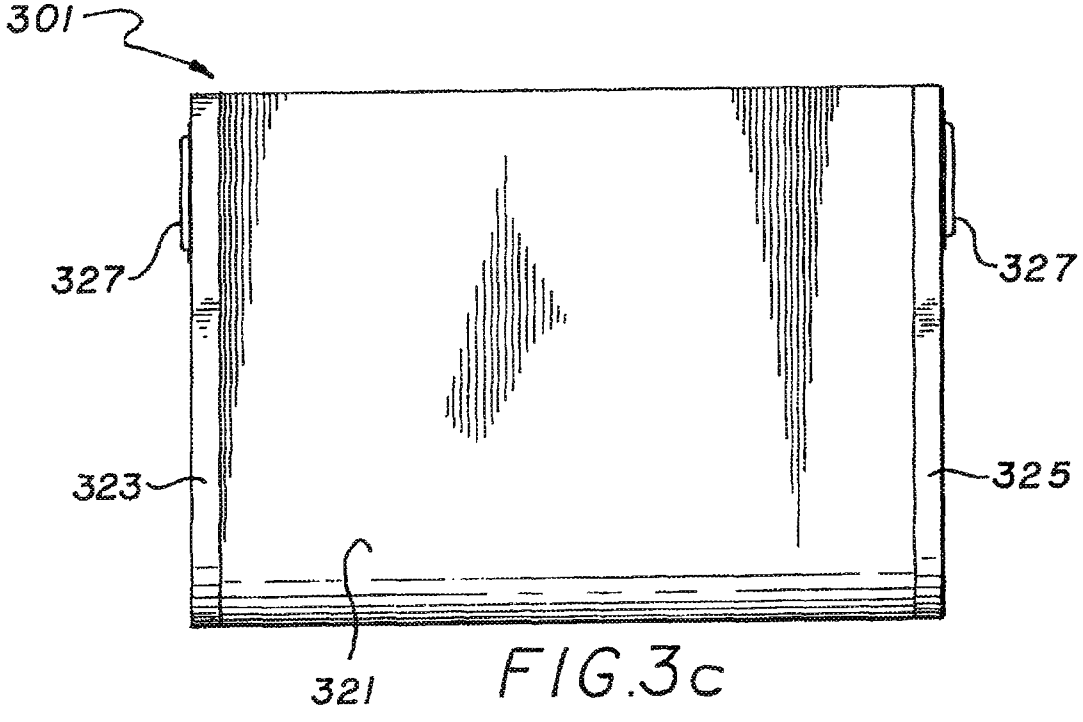
Figure 3D:
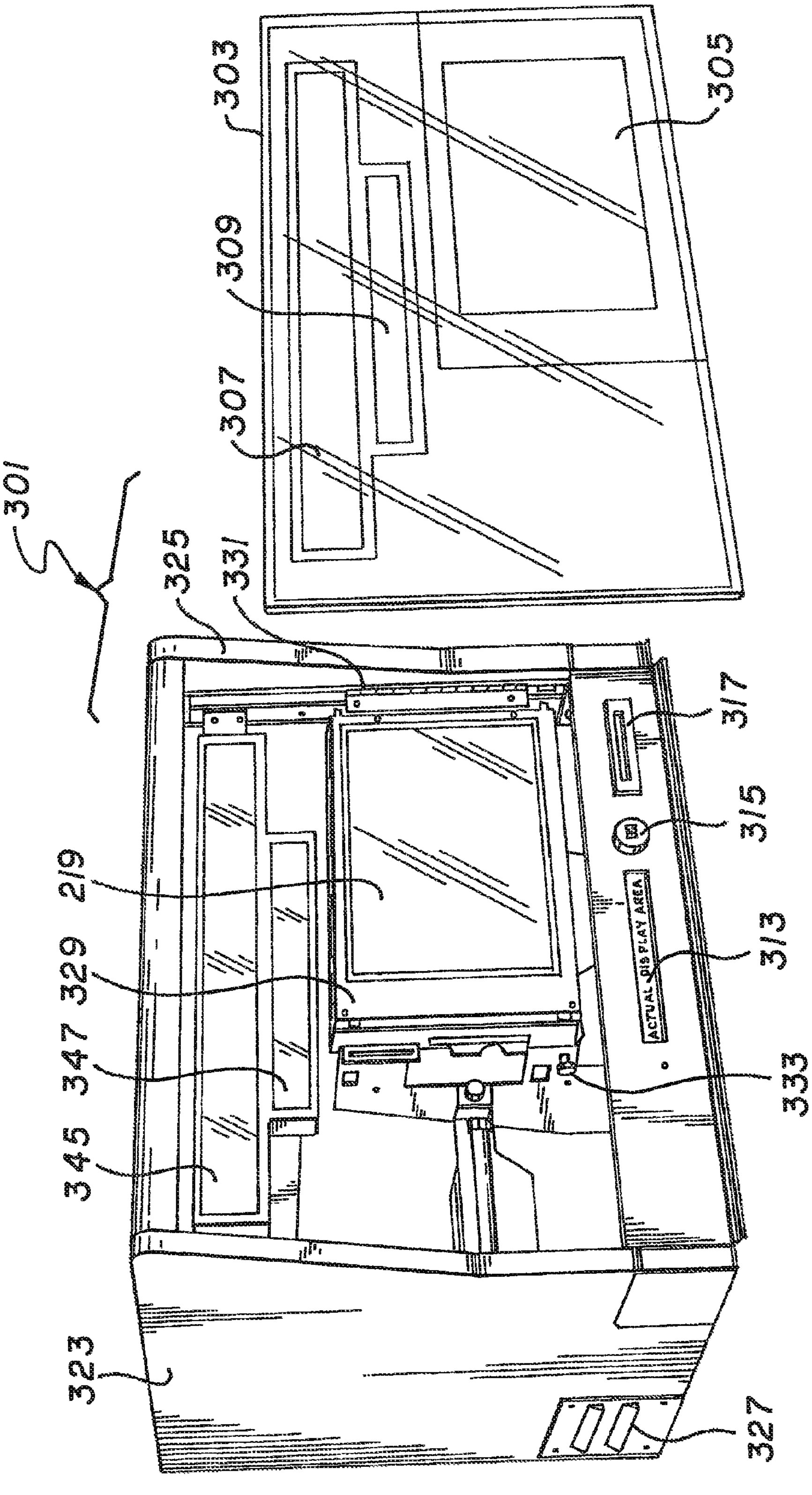
FIG. 3*d* is a perspective view of the slot machine top box of FIGS. 3*a*-3*c* having its top glass removed to expose the secondary display.
Figure 3E:
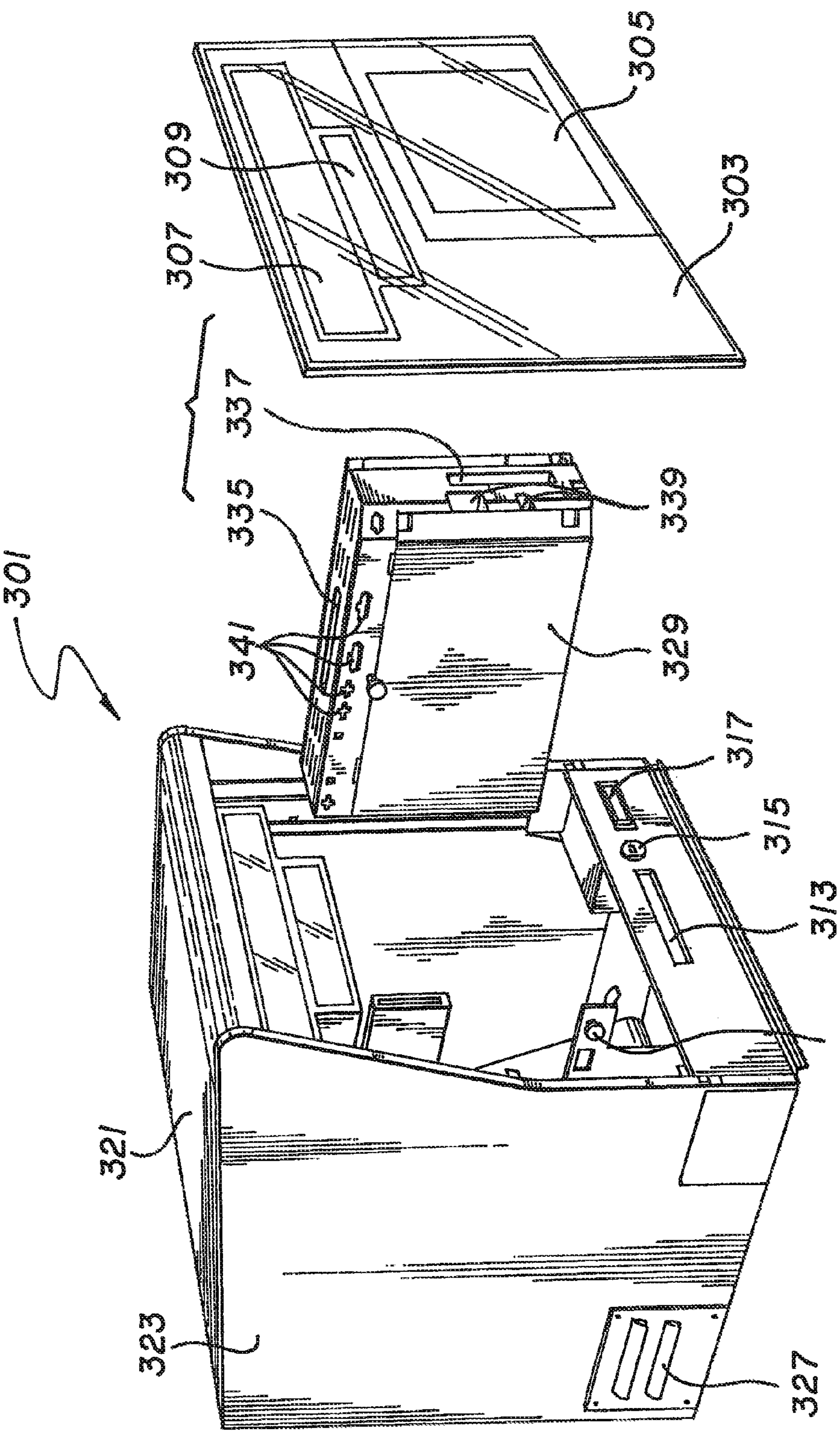
FIG. 3*e* is a perspective view of the slot machine top box of FIGS. 3*a*-3*c* showing the secondary display rotationally displaced about a hinged mount.

Turning now to FIGS. 3*a*-3*c*, the rectangular profile top box is displayed as it would appear installed on a gaming machine in a casino, for example. FIG. 3*a* is a perspective view, FIG. 3*b* is a front view, and FIG. 3*c* is a top view. FIGS. 3*d* and 3*e* provide additional perspective views of the top box illustrated in FIGS. 3*a*-3*c*. They show the top box as it would appear with the top glass removed and the secondary display module exposed. In FIGS. 3*a*-3*e*, like reference numbers will be used to illustrate like features.

A rectangular profile top box 301 includes a top glass 303 on its front face. Top glass 303 includes a display window 305 through which the video content of secondary display 219 can be viewed. To display primary and secondary information associated with progressive games, top box 301 may include a primary progressive display 307 and a secondary progressive display 309.

Other features on the front face of top box 301 are located behind top glass 303. These include a card reader 317 for accepting player tracking cards, credit cards, debit cards, etc., a card reader display 313 for displaying messages associated with card reader 317 (e.g., "INSERT CARD," "ENTER PIN," etc.), and special event button 315. In one embodiment, button 315 may include a light which, when illuminated, indicates to the player that a special play is available. This may be the case, for example, when the player has a special code on his or her tracking card. If the player elects to push button 315, when illuminated, then the system may play back multimedia content that advertises the special event. For example, the system may display a hurricane on display 219 and play back wind noises through its speakers. The player can then win additional cash or credits during a play on the machine.

The top box chassis has a front face as shown and described, as well as a top exterior surface 321, a left exterior surface 323 and a right exterior surface 325. The back and bottom surfaces are not shown. Left and right exterior surfaces 323 and 325 include vents or speaker ports 327.

As mentioned, FIGS. 3*d* and 3*e* illustrate top box 301 with top glass 303 removed. As shown, video display 219 is provided in a display module 329. Module 329 is mounted to the right panel 325 of the top box via a hinge 331. Module 329 is held in a display position by a latch mechanism 333 such a spring-loaded pin. When latch 333 is released, display module 329 may swing about hinge 321 to expose various cable connections and inserts for memory disks, as well as the interior portion of top box 301.

Display module 329 may include a metal or plastic casing having various connector ports and memory drive inserts. In a particularly preferred embodiment, display module 329 houses two flash disks, one for storing display screen animation employed in bonus games of this invention and a second for storing customer-specific applications such as advertisements describing casino services. In a preferred embodiment, both of these drives are PCMCIA drives. A PCMCIA insert port 335 is provided for the gaming-machine specific animation (e.g., the bonus game information). A PCMCIA card insert port 337 is provided for the customer-specific applications.

Two RCA cable ports 339 are provided for carrying stereo audio from an external source such as a video cassette recorder or other device that produces sound in conjunction with video display 219. In addition, five connectors 341 are provided for: 1) power; 2) communication with the main game being displayed on the main display 220 (RS 232); 3) communication with the game being displayed on main display 220 through a proprietary link known as netplex; 4) game sound; and 5) sound transmitted from module 329.

Displays 345 and 347 provide primary and secondary progressive game metering, respectively. As is known to those in the field, this primary metering represents the value of the top prize for the progressive system which has in the past exceeded $12 million on IGT's Megabucks® system. The secondary information represents a smaller secondary jackpot that is awarded more frequently when a particular combination of symbols appears on the payline.

FIGS. 4*a*-4*d* show an alternative embodiment employing a rounded or semidome shaped top box 302. In the Figures shown, features or elements which are identical to those shown in 3*a*-3*e* are indicated by like reference numbers. In fact, most features provided in the two embodiments are identical. The differences reside in the shape of a top box enclosure. Specifically, the top surface of top box 302 is a circular exterior piece 351. This rests on top of left and right housing portions 353 and 355. Circular top portion 351 gives top glass 303 a rounded profile as illustrated in the Figures. Air vents 357 are provided on each of housing portions 351, 353, and 355 (not shown). Speaker ports 356 are provided on the front lower corners of housing portions 353 and 355.

System Electronics

Figure 5:
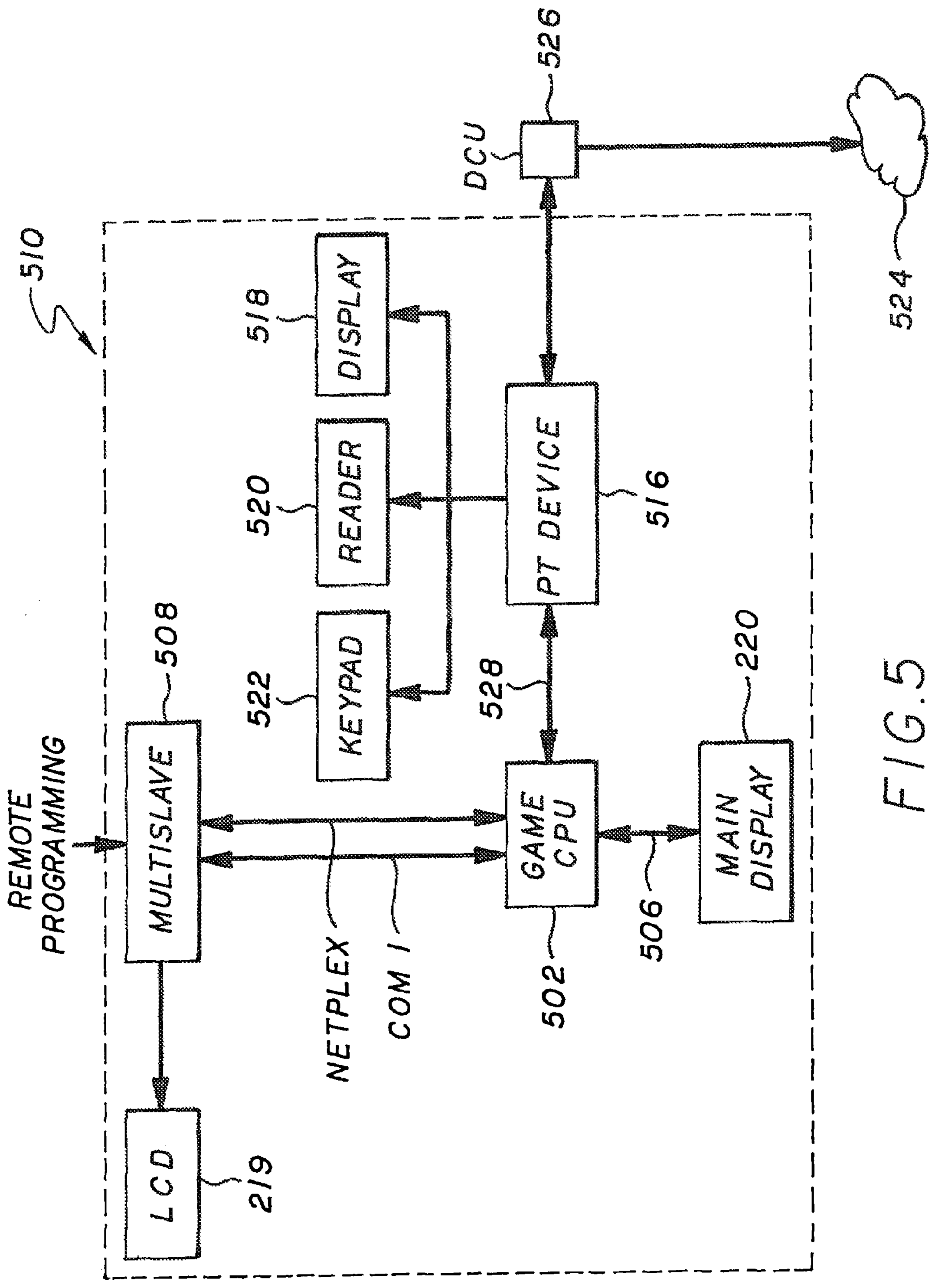
FIG. 5 is a block diagram of a control system in a slot machine containing a video display in accordance with an embodiment of the present invention.

FIG. 5 is a block diagram of one preferred architecture for a gaming machine 510 of the present invention. Central to the gaming machine is a gaming machine CPU 502 containing the logic for performing operations associated with executing plays on the gaming machine, interacting with gaining machine players, processing network information, providing information used by a tracking device, generating game outcomes, etc. Preferably, CPU 502 is a custom gaming machine CPU such as the 80960 microprocessor used in IGT gaming machines and manufactured by Intel Corporation.

CPU 502 is connected to a main display 220 and controls its content via control signals provided in any suitable format such as IGT's proprietary "Netplex" protocol. Netplex is implemented for use on a serial data communication interface utilizing an optically isolated current loop. The purpose of the Netplex is to provide a consistent communication protocol for all of the intelligent peripherals within a gaming machine. There are three Netplex signals: Receive, Transmit, and Reset. In addition, there are two power connections. The purpose of the Reset signal is to synchronously reset all of the peripherals. It should be understood that IGT's Netplex protocol could be substituted with other protocol schemes that are known to those skilled in the art of digital circuit design and programming.

Main display 220 is preferably a set of spinning reels or a CRT display. However, it is possible to use other types of displays such as LCD displays, plasma displays, field emission displays, digital micromirror displays, LCD touchscreens, etc. In a preferred embodiment, CPU 502 controls main display 220 indirectly via a stepper motor (not shown) in the case of a spinning reel slot machine or a video main graphics system (also not shown) in the case of a video display. The video main graphics system functions to drive main display 220.

Gaming machine CPU 502 also communicates with a "multislave" module 508. Multislave module 508 is in turn coupled to secondary display 219 that is preferably an LCD. Preferably, multislave module 508 communicates with CPU 502 via a proprietary Netplex protocol for resetting as described above. Communications, are through any standard port such as an RS232 serial port. Display 219 is representative of the larger class of video displays including, as mentioned above, liquid crystal displays, cathode ray tubes, plasma displays, field emission displays, digital micromirror displays, LCD touchscreens, combinations of these, etc. In a preferred embodiment, display 219 is an LCD Flat Panel, LQ10D421, available from Sharp Electronics of Camas, Wash.

As described below with reference to FIG. 6, multislave module 508 includes the logic for driving display 219. It may also include mass storage such as a hard drive and/or PCM- CIA cards. This storage may be employed to hold multiple images that are frequently displayed on secondary display 219 as well as associated sound.

Gaming machine CPU 502 may also be connected to a player tracking device 516 which is preferably a separate processor for handling player tracking information. Player tracking device 516 communicates with gaming machine players via an interface that includes a display 518, a card reader 520, and a keypad 522. Card reader 520 may be employed to read special player tracking cards issued by casinos or other entities. Alternatively, or in addition, reader 520 may also read credit or debit cards for accessing a player's remote financial account directly. In this regard, keypad 522 may be employed to key in account information allowing electronic funds transfer between gaming machine 510 and a player's remote financial institution. Gaming machines which allow access to remote financial institutions via credit or debit cards are described in U.S. patent application Ser. No. 08/639,762, previously incorporated by reference. It should be noted that insertion of a player tracking card may alert the machine that a particular customer is playing. In response, the machine may display particular images on LCD 219.

Preferably, the display 518 is an LED, small LCD, vacuum fluorescent, or dot matrix alphanumeric display (having, e.g., a sixteen character, fourteen segment display) which displays information relevant to player tracking, machine state, and/or electronic funds transfers. Such display information includes, for example, a prompt to enter a personal identification number, a notice that a credit transfer was authorized, an amount of the authorized transfer, machine diagnostics, insert coins messages, and bonusing for a particular game. Suitable displays may be obtained from various vendors such as Futaba of Japan. Alternatively, the content provided on display 518 may be provided on main display 220 or secondary display 219.

Finally, player tracking device 516 communicates with a network 524 via an optional data collection unit ("DCU") 526. Network 524 may be a casino communications network including a number of slot machines connected to one another by communications cables to form a floor communications network. Within this network, DCUs. such as unit 526 connected to machine 510 act as communications multiplexers for groups of gaming machines on the floor network. The DCUs preferably have some limited processing capabilities for the purpose of polling machines, storing and forwarding communications, etc. In one specific embodiment, a single DCU is coupled to thirty-two gaming machines. While the floor network physical connections among the individual gaming machines and corresponding DCUs may take various forms including wireless connections, in preferred embodiments, the floor network is provided on fiber optic cable.

In alternate embodiments, the DCUs may be replaced with direct connections to the slot machines. The DCUs simply provide greater adaptability to changes in the network configuration.

Figure 6:
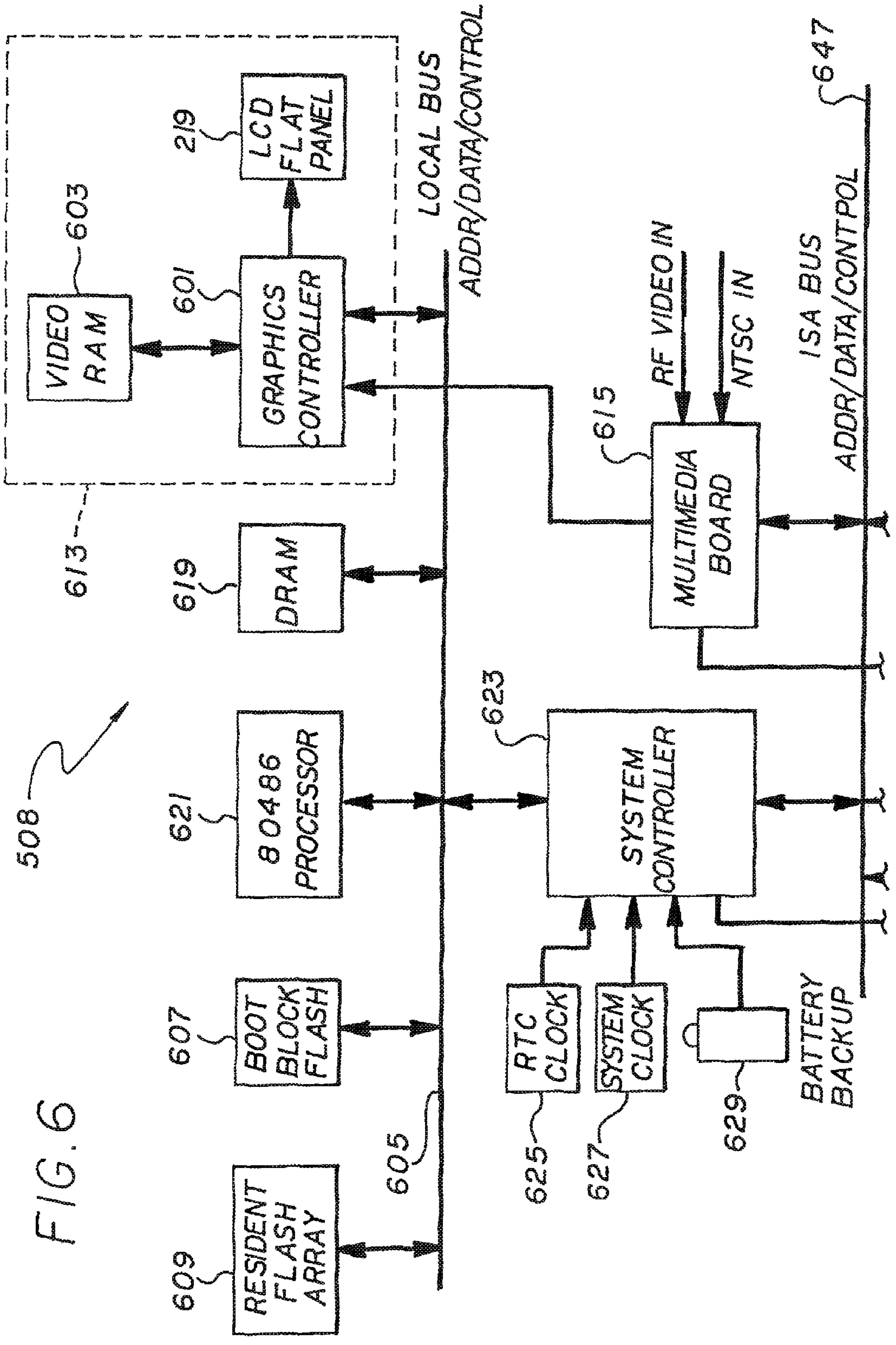
FIG. 6 is a block diagram of a multislave unit for controlling video content on a secondary display in accordance with an embodiment of the present invention.
Figure 6:
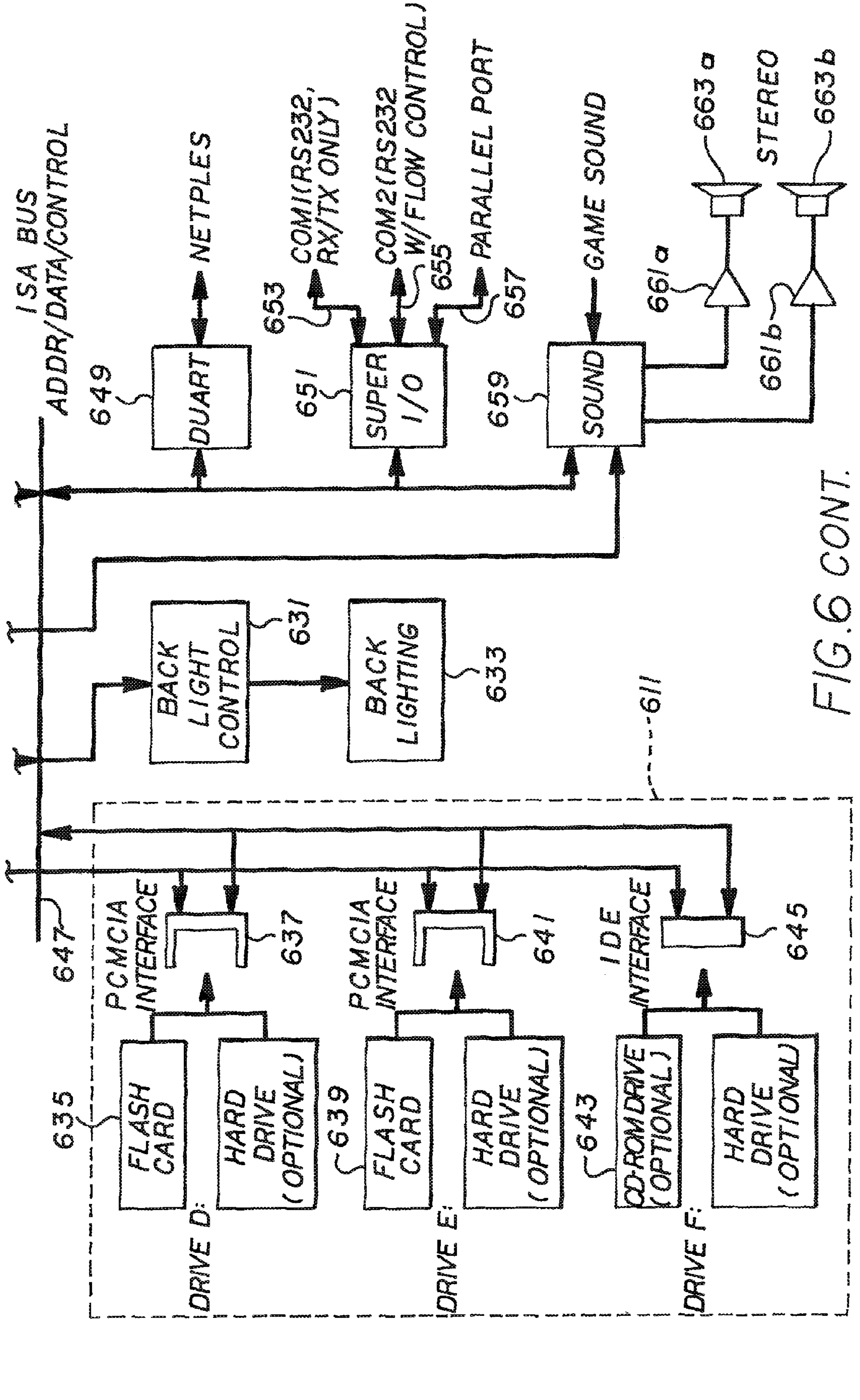

FIG. 6 presents one example of a multislave module 508 suitable for use with display 219. As shown, multislave 508 includes a graphics controller 601 which provides data to LCD flat panel 219. Graphics controller 601 receives digital images and provides the pixel-by-pixel digital output to LCD 219. Preferably, graphics controller 601 also provides some higher level functionality such as resizing graphical displays, etc. By providing such high level functionality, controller 601 reduces the burden on other processors in the system. One suitable graphics controller is the model CL-GD 7548 available from Cirrus Logic of Fremont, Calif.

Graphics controller 601 may be coupled to a video memory 603 which temporarily stores a limited number of video images for rapid display on LCD 219. In one example, video memory 603 stores about two megabytes of video data, implemented with four 256K by sixteen DRAM devices. More preferably, video memory 603 has the capacity to store 8-10 megabytes of images for display on LCD 219.

The video data storage in memory 603 is preferably provided in an uncompressed format. It stores a currently displayed frame plus other video information that might be displayed in the very near future. For example, it may store all the data associated with a particular bonusing animation, or possibly two bonusing animations. Preferably, it stores the background for the animation as a general frame in which individual animation figures can be moved about within the frame. For example, a race track animation may include a background frame in which three lanes are provided for three separate racing elements (e.g., represented by the numerals seven). In addition, memory 603 would store the individual racing elements (e.g., the sevens). In response to appropriate events, graphics controller 601 runs an animation causing the individual racing icons to move from left to right on the screen. It accomplishes this by erasing a block where the icon had previously been displayed, filling in that block with the background frame from memory 603, and moving the racing icon a certain distance to the right. In one specific embodiment, this repositioning might be accomplished in about fifty movements, each separated by a few milliseconds, to give the appearance of a continuous motion.

Together, graphics controller 601, video memory 603, and LCD flat panel 219 comprise a video sub-section 613 of multislave 508. It should be understood that graphics controller 601 represents generally controllers capable of driving plasma displays, field emission displays, digital micromirror displays, etc. in addition to LCD flat panel 219.

Graphics controller 601 communicates with other elements of multislave 508 over a local bus 605 which transmits address, data, and control signals. In addition to graphics controller 601, other elements of multislave 508 coupled by local bus 605 include a boot block flash memory 607, a processor 621 and a system controller 623.

When the system is powered up, boot block flash memory 607 which contains the system BIOS sets up a resident flash array 609 to make it appear as a hard drive to processor 621 and other system elements. It does this by storing the multislave's operating system, certain common internal video images provided via the multislave, and an application for controlling the audio and video output of multislave 508. Among the "common images" stored in resident flash array 609 are tilt images, diagnostic images, etc. In one preferred embodiment, the operating system is DOS and Windows available from Microsoft Corporation of Redmond, Wash.

The application stored on flash array 609 interacts with three primary components of multislave 508. These are the video sub-section 613, a mass storage section 611, and a sound board 659. The application on array 609 also interacts with a multi-media board 615 connected to multislave 508.

A DRAM 619 buffers audio and video data to be output by multislave 508. By way of example, RAM 619 might have a 64 megabit storage capacity. Processor 621 executes the application resident in flash array 609 to perform such functions as accessing peripherals and controlling the display of bonusing animations. Preferably, processor 621 has the speed and processing power of at least a 486 series microprocessor available from Intel Corporation of San Jose, Calif. (e.g., a 80486DX4-100 microprocessor).

System controller 623 preferably integrates the functions of a conventional PC motherboard on a single chip. In one preferred embodiment, system controller 623 is provided as an R400EX high integration 486 single chip controller available from RadiSys Corporation of Hillsboro, Oreg. Among the specific functions provided by controller 623 are the following: memory control for DRAM 619, control of interfaces to mass storage elements in mass storage block 611, interrupt arbitration, and providing clock signals from a real time clock 625 and a system clock 627. It also provides power to the remainder of multislave 508 through a battery backup 629. Still further, it instructs a back light controller 631 to appropriately control back lighting 633.

Back lighting 633 provides the light necessary to illuminate images on LCD 219. Multislave 508 controls the back lighting so that it can be turned off during the system boot stage. Normally during the stage, the system would cause back lighting 633 to flash a response to certain boot operations. To prevent this potentially annoying effect, back light control 631 is provided to turn off the back lighting 633 at appropriate times.

Mass storage block 611 is shown to include three separate mass storage devices. A semi-conductor memory device 635 such as a PCMCIA card stores various pieces of video images internal to multislave 508. These video images include, for example, various bonusing animations (including audio). Semi-conductor memory 635 is read from and written to through an interface 637. A semi-conductor memory 639 (e.g., a PCMCIA card) accessible through an interface 641 stores various operator images such as logos, screen savers, associated sounds, etc. Often these will be the images or animations associated with the casino operating the slot machine. Finally, a CD ROM drive 643 is optionally provided to store other types of video data such as digital video disc (DVD) or Motion Pictures Expert Group (MPEG) data. Drive 643 interfaces with the rest of multislave 508 through an Integrated Drive Electronics (IDE) interface 645. A CD ROM drive has the advantage of allowing data to be easily swapped in and out of the system through replaceable CDs. In contrast, semi-conductor memory, magnetic memory, and other forms of harddrive require some form of serial programming. However, CD ROM drives may have lower capacity and lower reliability than the semi-conductor drives 635 and 639. Thus, the system preferably includes both drive types.

When the application resident on flash array 609 determines that access to a particular piece of data stored in mass storage block 611 should be accessed, it communicates a request for that data over local bus 605 to system controller 623. System controller 623 then specifies the address of the data to be retrieved and presents that address to interface 637, interface 641 or interface 645, as appropriate. The appropriate interface then retrieves the requested data and provides it to an ISA bus 647. The data on this bus is then provided to system controller 623 which oversees copying of the data to DRAM 619. Some of the video data provided to DRAM 619 is then temporarily stored on video memory 603 for immediate access by graphics controller 601. Note that resident flash array 609 and DRAM 619 are also provided on ISA bus 647 along with system controller 623.

It should be understood that processor 621 is dedicated to multislave 508 and plays no role in the outcome of a game or bonusing scheme. It merely oversees video and audio output from multislave 508 in response to game events controlled by CPU 502 depicted in FIG. 5. This separation of responsibilities has the advantage of certain prior regulatory review for approval by the appropriate gaming authorities. Generally, gaming authorities such as the Nevada Gaming Commission very carefully regulate the introduction of new gaming output systems through in-depth examination of these systems. In the case of the present invention, the gaming output controller is CPU 502 which has already been approved by the relevant gaming authority. The introduction of multislave 508 with processor 621 into a gaming machine system for the purpose of additional display in no way affects game outcomes and would require no additional scrutiny with respect to game play.

Inputs to multislave 508 include a Netplex communication line to a dual universal asynchronous receiver transmitter ("DUART") 649 for sending Reset signals to multislave 508 from CPU 502. While not shown, the Netplex communication line may include a discrete line which provides the Reset signal directly to system controller 623. This allows the multislave to be reset synchronously with other peripherals on the gaming machine system. In one specific embodiment, DUART 649 is a model MC68681 available from Phillips Semiconductor of Sunnyvale, Calif. Other inputs are provided through a "Super I/O" interface 651 connecting to a first communications line 653 such as an RS232 serial line. Preferably, line 653 is employed to receive relevant game outcome events from CPU 502. A second communications line 655 is also optionally provided to super I/O interface 651. Line 655 is also preferably a RS232 serial line. In a specific embodiment, it is provided only for expansion purposes. A suitable Super I/O interface may be obtained from Standard Microsystem Corp. of Hauppauge, N.Y. Finally, a parallel port 657 is provided to I/O interface 651. Parallel port 657 allows high-speed downloads of new programs to multislave 508.

An exemplary list of signals provided through lines 653 and the line to DUART 649 includes the following:

Trigger signals Play Sound Plays sound from sound table Reset Resets Multislave Tilt A tilt has occurred Tilt Clear A tilt has just been cleared Door Open The door has been opened Door Clear The door has just been closed Machine Event An event internal to the machine occurred, such as switch press Critical Game Event An event critical to the game operation occurred, such as game started Progressive Event An event relating to progressive occurred, such as progressive combination was won All Games Supported All games supported by the machine New Game Event A new game type has been entered Attendant Event Attendant (Options) menu has been entered Attract Event Start/Stop Attract Sequence Set Attract Sequence Enable/Disable Attract Sequences Initialize Bonus Game Setup bonus game Bonus Game Event An event such as coin in has occurred Bonus Game Win Category A specific win category has been hit Kill Bonus Game End bonus game Request Program Versions Request software version from multislave Request Sound Request sounds from sound table from multislave Request Attract Sequences Request attract sequences from multislave The sound interface 659 provides stereo output to amplifiers 661A and 661B which drive speakers 663A and 663B respectively. Sound interface 659 also mixes audio signals from other sources in gaming machine 510 with audio signals generated within multislave 508. Such internally generated signals are stored on semi-conductor storage devices 635 and 639, for example. During playback of an animation, for example, sound interface 659 may access internal audio data directly from DRAM 619 by DMA.

In a preferred embodiment, sound interface 659 is compatible with "Sound Blaster Pro" standard. In one specific embodiment, sound interface 659 is an ES1688 available from ESS Technology, Inc. of Fremont, Calif.

In operation, when the system powers up or there is a change in the bonus game being played, all necessary audio and visual information for the new animations or early display is loaded into DRAM 619. For internally held data, this loading process is controlled by system controller 623 as described above. When the appropriate video data is loaded into RAM 619, at least a few frames of that data are provided over local bus 605 to graphics controller 601 and temporarily stored in video memory 603. Graphics controller 601 then controls the display of the content from video memory 603 on LCD 219 in accordance with the animation. Concurrently, audio information is played back when processor 621 instructs sound interface 659 (through system controller 623 and ISA bus 647) to begin audio playback. At that point, sound interface 659 gains control of the bus during idle times of the processor to directly access the appropriate audio information from DRAM 619.

Figure 7:
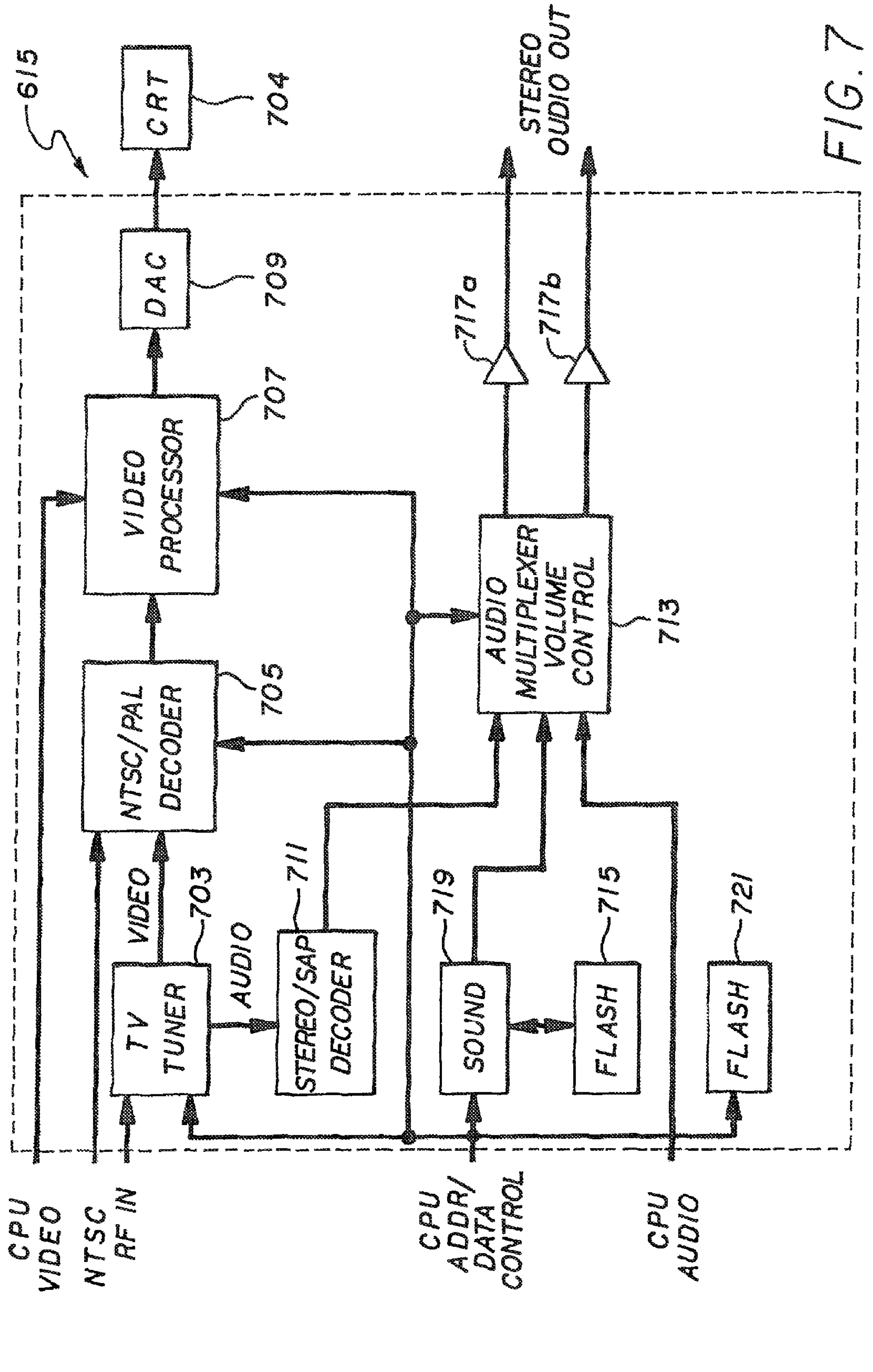
FIG. 7 is a block diagram of a multimedia unit for use with the multislave depicted in FIG. 6.

FIG. 7 presents a block diagram of the multimedia block 615 shown in FIG. 6. It should be understood that in the context of FIGS. 5 and 6, multimedia block 615 can be mounted (or interfaced) directly on a "game board" (CPU 502) or on the multislave board (controlled by processor 621). If multislave module 508 is employed in a spinning reel slot machine, multimedia block 615 preferably mounts with processor 621 on the multislave module. If, on the other hand, module 508 assists a video gaming machine, block 615 preferably mounts with CPU 502 on the game board.

Multimedia board 615 can accept multiple video inputs from a network or other sources. As shown, the inputs to multimedia board 615 possibly include NTSC signals from VCR-type sources and RF video signals from cable television-type sources. Examples of such inputs include casino kiosk information, television broadcasting, etc. Various inputs are available from CPU 502 (FIG. 5). These include video signals indicated as "CPU video," audio signals from the CPU indicated as "CPU audio," and address, data, and control signals. Each of the CPU inputs may be provided over the local bus 605 shown in FIG. 6. In the case of a spinning reel slot machine, the input line CPU Video need not be provided. The output of multimedia board 615 includes digital video signals to main display 220 and to graphics controller 601. Note that in the case of a video gaming machine, multimedia module 615 acts as an interface between CPU 502 and main display 220. Additionally, stereo audio output is provided to speakers 663A and 663B (via sound block 659) as shown in FIG. 6.

RF video programming provided to multiboard 615 is first processed by a television tuner 703. Tuner 703 separates the audio and video signal content from the RF input signal. The video signal is directed to an NTSC/PAL decoder 705 which decodes encoded video data in accordance with industry standards. Decoded video data from block 705 is provided to a video processor 707 which mixes video signals from various sources including CPU 502 digital video. The mixed video signals are then directed to a digital analog converter 709 which outputs an analog video signal to the main display 220. Video signals from NTSC sources are input directly to decoder 705. Otherwise, they are treated identically to the video portion of the RF input signal. Video signals for secondary display 219 are output directly from decoder 705, as shown, and directed to graphics controller 601 for further processing.

In one specific embodiment, tuner 703 is a F11236 available from Phillips Semiconductor of Sunnyvale, Calif., decoder 705 is a SAA7110 available from Phillips Semiconductor of Sunnyvale, Calif., and processor 707 is a VxP202 available from AuraVision of Fremont, Calif.

The audio component of the RF input is output from television tuner 703 to a stereo/SAP decoder 711. This block decodes encoded audio data from the RF input. In one specific embodiment, decoder 711 may be a TDA9850 available from Phillips Semiconductor of Sunnyvale, Calif. The decoded data output from decoder 711 is fed to an audio multiplexer and volume control unit 713. Multiplexer 713 multiplexes sound from various sources including audio data from the RF input (as described), audio data stored in a flash memory 715, and audio data provided directly from CPU 502. Multiplexer 713 is controlled by control signals from CPU 502 or from CPU 621 provided over local bus 605, for example. In one specific embodiment, Multiplexer 713 may be a LM1973 multiplexer available from National Semiconductor of Santa Clara, Calif.

It should be noted that television tuner 703, decoder 705, and video processor 707 are also controlled by control data from CPU 502 over data bus 605. Control signals from CPU 502 may also be employed to control the volume of the audio signal at multiplexer/controller 713. The output of multiplexer/controller 713 is a stereo signal which is provided to stereo amplifiers 717A and 717B. In one embodiment, a volume control unit provided with multiplexer 713 is a YAC513 available from Yamaha Corporation of San Jose, Calif.

As noted, audio data may be stored in a flash memory device 715. This data is accessed by a sound controller 719 which is coupled to address and control signals from CPU 502. The sound data extracted from flash memory 715 by controller 719 is provided to multiplexer/controller 713. A final input to multiplexer/controller 713 is provided directly from CPU 502 as shown. The signals on this line are audio signals provided directly from CPU 502. Sound controller 719 may be a YMZ280B available from Yamaha Corporation of San Jose, Calif. Finally, multimedia board 615 may include additional flash memory 721 provided to store extra data as necessary.

Projection-Mode LCD

Figure 4A:
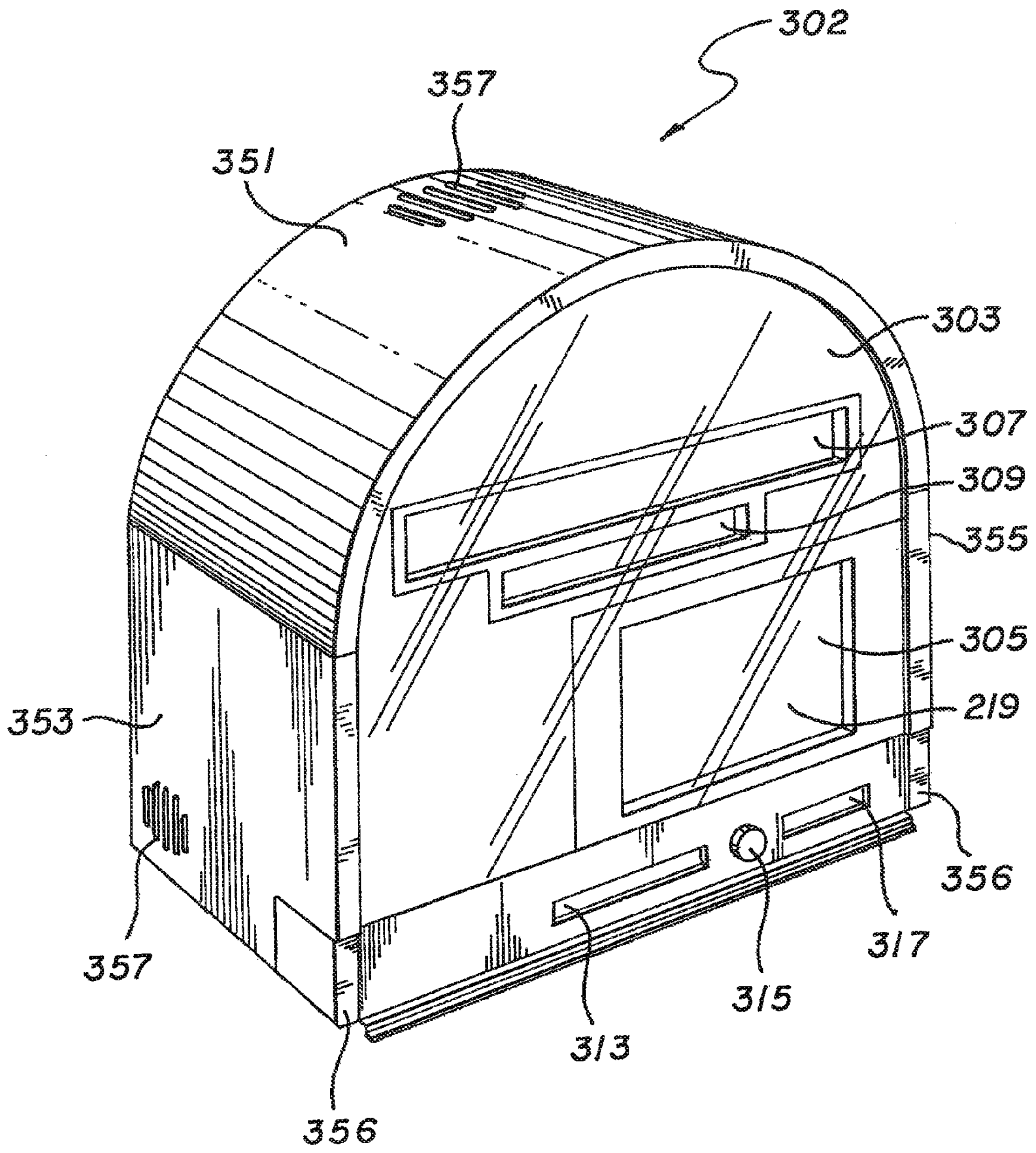
FIGS. 4*a*-4*c* are perspective, front and top views of a rounded profile slot at machine top box in accordance with a preferred embodiment of the present invention.
Figure 4B:
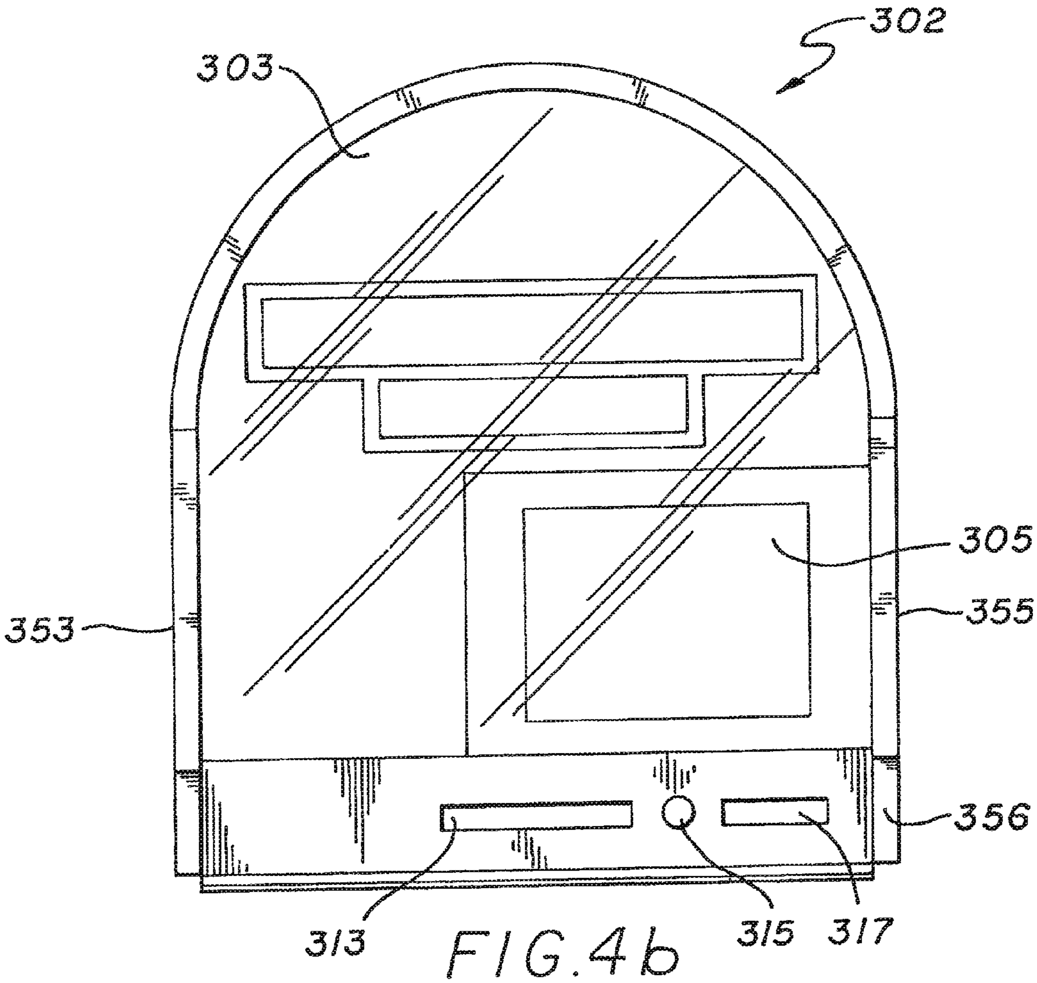
Figure 4C:
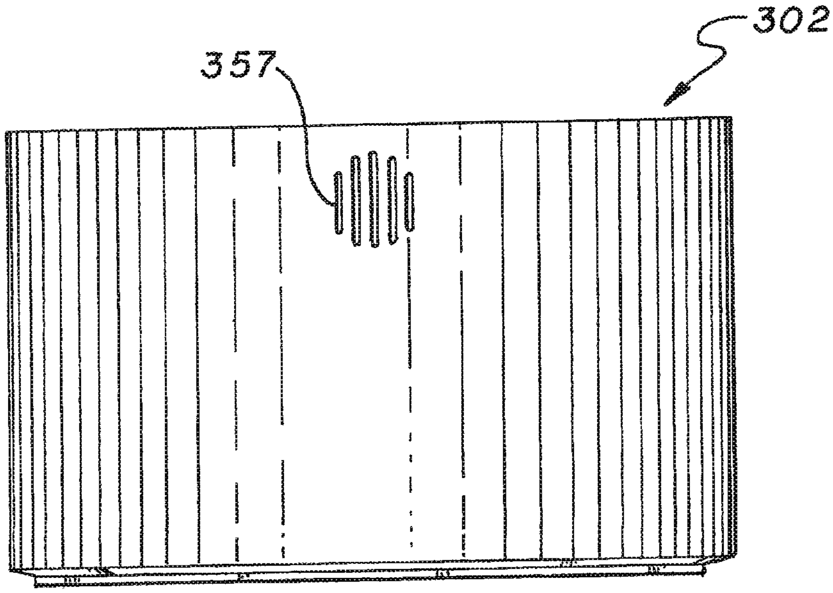
Figure 4D:
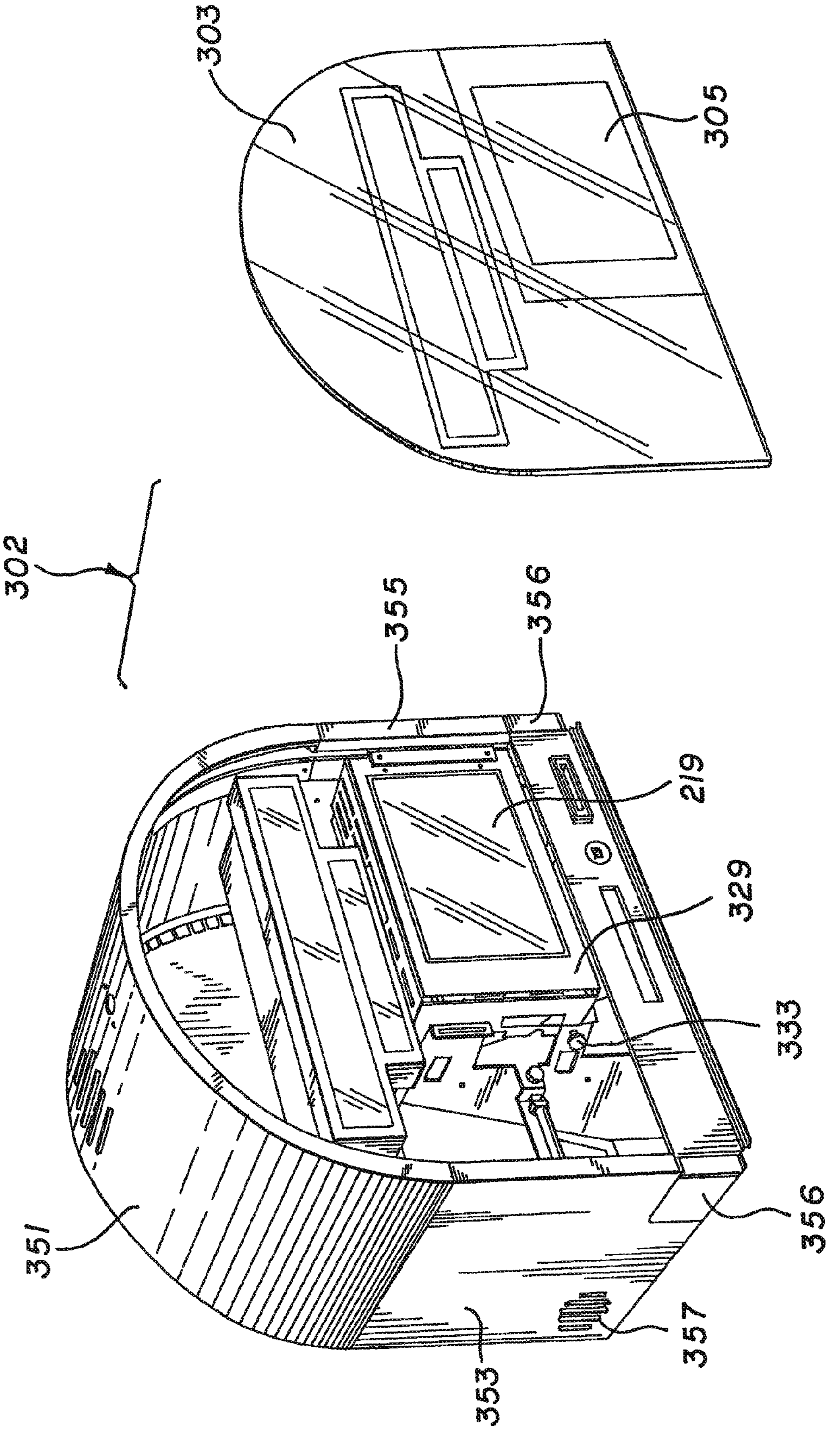
FIG. 4*d* is a perspective view of the slot machine top box of FIGS. 4*a*-4*c* having its top glass removed to expose the secondary display.
Figure 8:
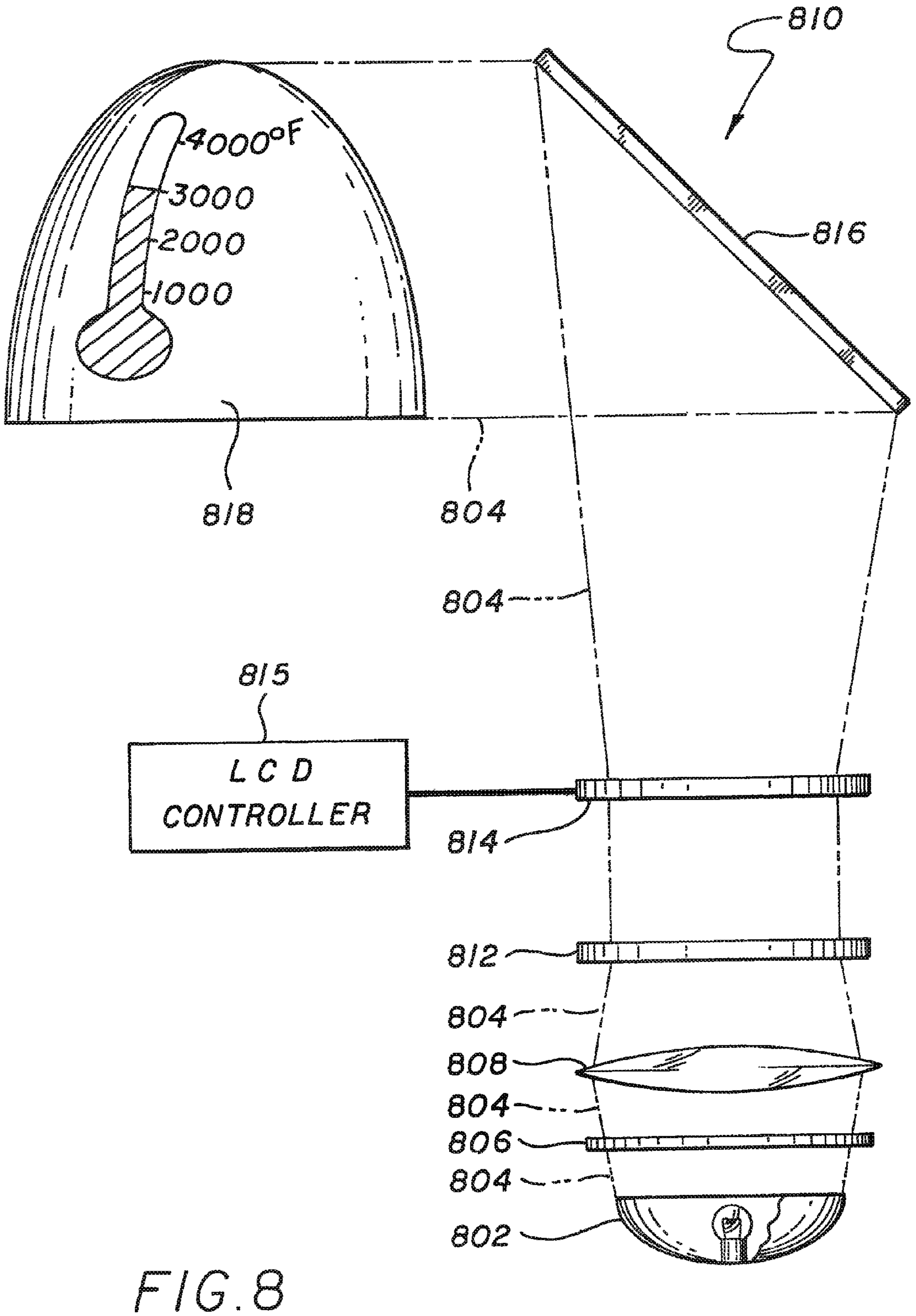
FIG. 8 is a schematic illustration of a video display system for a gaming machine including a projection mode LCD.

FIG. 8 presents a projection-mode LCD system 810 in accordance with an alternative preferred embodiment of the present invention. In the embodiment shown, a light source 802 is mounted near the bottom of a gaming machine. This may be necessary to ensure that the beam path is sufficiently great to project an expanded image onto the exterior of the gaming machine. Light source 802 produces a light beam 804 which passes through a hot mirror 806. The function of hot mirror 806 is to reduce the amount of heat energy in beam 804. Examples of hot mirrors suitable for use with this invention include hot mirror #A43, 452, Edmund Scientific Industrial Division, Barrington, N.J. After passing through hot mirror 806, beam 804 encounters a focusing lens 808 which focuses beam 804 onto a fresnel lens 812, which collimates beam 804 and directs it onto a projection-type LCD 814. Examples of suitable projection-type LCDs include LQ 64 P312 Sharp TF7 Module Sharp Electronics Corp., Camas, Wis. Preferably, LCD 814 is controlled by a suitable controller 815 such as the processor and controller arrangement found in gaming machine CPU 502 and multislave 508 shown in FIG. 5. As beam 804 passes through LCD 814, the video information displayed on LCD 814 is imparted to beam 804 which expands onto a mirror 816. The mirror then redirects beam. 804 toward a display 219 on the gaming machine exterior. Thus, video content provided to projection-type LCD 814 is displayed to a gaming machine user on a secondary display window such as window 305 (FIG. 4*d*).

The shape of the material displayed on secondary display 219 may be controlled by "cropping" the image provided by projection type LCD 814. The cropping information is provided as part of the video signals from controller 815. These signals may specify, for example, that the top corners of the LCD 814 are made opaque so that the video content displayed on the glass 303 has a hemispheric shape 818 as shown in FIG. 8. Of course, the cropping may be controlled to present many different shaped screen displays such as circles, rectangles, and various polygons or even 3-dimensional images.

Another advantage of a projection mode LCD is potentially reduced costs of the gaming machine display. Generally the cost of a liquid crystal display varies nearly directly with the area of the LCD. Thus, smaller LCDs are less expensive than larger LCDs. Because relatively small LCD displays can be employed on projection-mode systems, the cost of building a gaming machine is reduced in comparison to gaming machines having large LCDs provided directly on the exterior of the gaming machine. Digital micromirror displays may be employed in a manner similar to the LCD projection devices.

Video Content

Typically, the video content displayed on a video display such as secondary display 219 of this invention will be carefully controlled. As described above, the content may fall under one of at least three categories: primary information, secondary information, and tertiary information. Examples of primary information include indications of a "currency in" stage in which the machine awaits a coin or bill insertion to initiate a play, a "game play" stage in which the player has initiated a play (e.g., spinning reels on a slot machine), and a "game result" stage in which a payout may be registered. Primary game outcome information includes payout information provided to a gaming machine player indicating how much, if any, payout the player should receive upon alignment of particular symbols on the payline at completion of a game. The primary game outcome information may also include such information as a pay table describing winning combinations and the amount of payout a given combination will provide. Other primary events include general gaming machine state changes such as malfunction (e.g., a tilt). Examples of secondary information include information about slot tournaments, progressive games, bonusing schemes, and other incentives challenging the player to keep playing or to play in a particular manner. Examples of tertiary information include billboard information, advertisements, television programming, player attraction material, casino kiosks, video conferencing, and combinations thereof.

A casino kiosk may provide a menu for casino services such as help from an attendant, ordering drinks and food, reserving taxi cabs, obtaining tickets for shows, conducting banking transactions, learning about the availability of health clubs, shops, restaurants, etc. Such kiosks are now physically provided in a single centralized location within a casino. By allowing the user to access the kiosk from the gaming machine at which he or she is currently positioned, the player need not leave that machine to take advantage of other casino services. Thus, the user may continue playing at a given machine without interruption if desired. In one preferred embodiment, the player communicates his or her requests via a menu displayed on the secondary display screen—without the intervention of a casino attendant. The menu driven requests might include, for example, car reservations, drink requests, movie, dinner or theater reservations, messages for a particular room, taxi cab requests, etc.

Television programming may be provided to the video display via a cable link or other suitable link. All or some subset of the programming provided by a television broadcaster may be displayed as content on the video display. Television programming content of particular interest to casino operators may include, for example, sporting events, talk shows, game shows, soap operas, advertisements, situation comedies, etc. In addition, broadcasts of competitive events on which the player can wager may be displayed. For example, dog racing or horse racing events may be displayed as content on the video display. In such events, there is typically a rather long down time between races. During this period, the player may play the gaming machine. Then, when a race begins, the player focuses his or her attention on that event without needing to leave his position at the gaming machine. Similarly, the video content may include information available on the Internet, including the World Wide Web, for more technologically sophisticated players.

Another use of the video display may be to provide two-way communication between the gaming player and a casino attendant or other individual. In such devices, a camera and microphone would be outfitted on the gaming machine. This arrangement would have the additional benefit of enhancing the security of the gaming machine. As attempts to defeat gaming machines become more wide spread, such security devices would deter would-be thieves from attempting to cheat the gaming machine. Note also that by outfitting a gaming machine with a camera, a microphone, or other such devices, the player's image could actually be displayed as video content on the display. Various novel effects could be generated from this content. For example, the player's face could be morphed into a movie star, a sporting figure, or other well-known individual. By carefully controlling such video content, the casino operator could attract greater numbers of players to particular gaming machines. In addition to communicating with casino attendants, a player could, for example, schedule later activities with his or her spouse, or other associates.

Various secondary game features are known in the art. These include, for example, slot tournaments and bonusing schemes. Slot tournaments involve a group of gaming machine players competing against one another in a manner that allows the player or players with the highest score or scores to win additional rewards. These rewards may include, for example, additional plays on a given machine, additional payout, free casino services, etc. In bonusing games, each winning play on a machine may be registered such that after a certain number of winning plays, a bonus is received. Thus, for example, after the eighth winning play on a given gaming machine, an additional reward is provided to the player. However, if the player leaves the gaming machine before that eighth winning play results, the player cannot receive the bonus. A subsequent player might then build on the winning plays of the previous player so that the second player can receive die bonus. In such games, there must be some mechanism to show the user that a bonus is available and how it is attained. Conventionally, this was accomplished with small lights or other symbols provided on the top glass of the gaming machine. With a secondary display of this invention, such bonusing information can be presented in many different formats. For example, the bonusing symbols may take the form of an animated automobile one week, an airplane another week, a boat another week, a pie with slices or thermometer yet another week, etc.

Still further, the secondary displays of this invention may be employed to display variable themes associated with a particular casino or gaming machine. As is known in the art, casinos periodically change themes associated with their gaming machines. This provides fresh ornamentation and incentives which are useful for attracting potential players. Examples of successful slot machine themes include "Red White and Blue," "Double Diamond," and "Wild Cherry."

In prior art multi-game machines, multiple games such as keno, video poker, etc., may be available for play on a single machine. Obviously, each of these games has a separate pay table. In single game machines, such pay tables are presented permanently on the top glass or a belly glass of the machine. In multi-game machines, such information may be provided on a CRT screen in response to menu driven commands on a touch screen portion of the CRT. Because a CRT provides the primary game playing information (e.g., keno results or cards drawn in video poker), a pay table cannot be simultaneously displayed to the user while he or she is playing one of the multi-gaines available in the machine. Thus, the only way to access a pay table is through the menu when the primary game is not being played. This can be confusing to the player.

In contrast, secondary display 219 provided on the top glass (or reel glass or belly glass 225) of the present invention allows a player to monitor his or her primary game while simultaneously examining the pay table. In this embodiment, a separate pay table is displayed on the top glass display 219 for each of the multiple games available on the machine. For example, if a user selected a keno game from the main display, the pay table presented on the top glass display 219 would be for a keno game. if the user thereafter decided to play a video poker game, the pay table presented on display 219 could show the appropriate poker pay table. Thus, the present invention allows users to more easily play the various games on a multi-game machine.

Bonus Games

As used herein, the terms "bonus game," "secondary game," "bonusing game," and "variations thereof" all refer generally to a game or a component of a game involving procedures in addition to the primary game on the gaming machine. For example, if the primary game is a reel slot game, the bonus game may allow players the possibility of winning more than the pay table indicates. Typically, but not necessarily, the bonus game outcome will depend upon the outcome of the primary game. For example, a bonus game outcome may be contingent upon a "cherry" symbol being displayed on a slot reel at the end of a slot game play. Also, the bonus game outcome may depend upon winning a payout from a slot game play while the gaming machine is in a "bonus zone." In alternative embodiments, the bonus game may be unconnected with the outcome of a primary game play.

Figure 9:
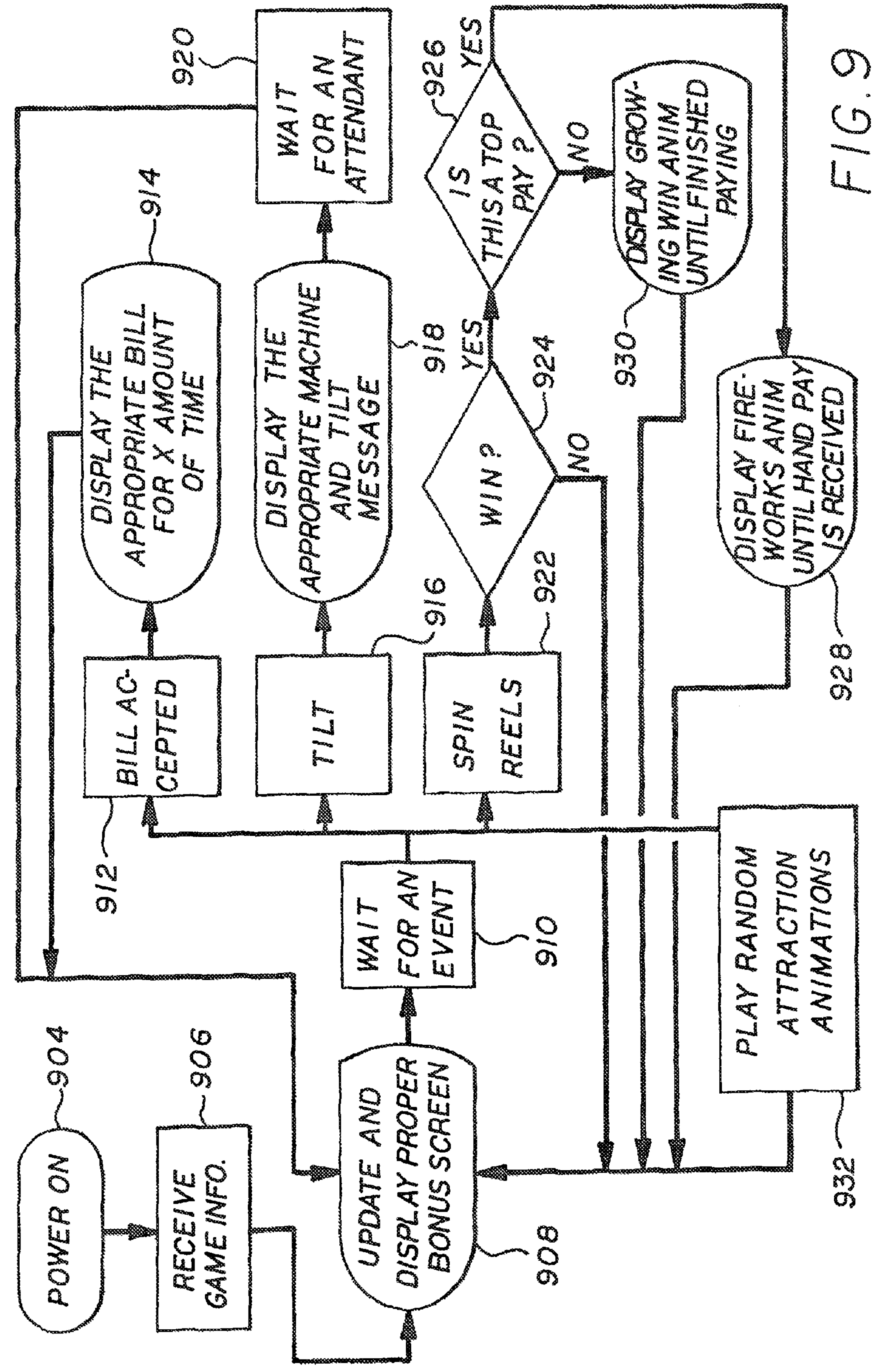
FIG. 9 is a process flow diagram of a general method for controlling video content in accordance with an embodiment of the present invention.

FIGS. 9-13 illustrate examples of how the video display screen of the present invention may be employed to display secondary and tertiary information. A general process flow for controlling secondary display 219 is depicted in FIG. 9. From the gaming machine and the video display screen perspective, the first event of relevance is the powering on of the machine as indicated at a step 904. Shortly thereafter, the system of FIG. 6 may receive pertinent game information at a step 906. This information may specify which particular bonus games are to be made available initially on the gaming machine. At this stage, the system may also perform a self check to ensure that it is functioning properly.

At a step 908, the system updates secondary display 219 to present bonus information associated with the currently available game. During this step, the gaming machine may remain idle or the operator (e.g., the casino) may display some tertiary content such as a casino kiosk or a sporting event. However, until a content sensitive event takes place, game specific information need not be displayed on secondary display 219. This is indicated at a step 910 which specifies that the system is simply waiting for an appropriate event. In the embodiment shown in FIG. 9, there are four pertinent events.

The first event of interest is a bill insertion event (or alternatively, a coin insertion event) as depicted at a step 912. In this embodiment, when a bill or other appropriate currency is inserted into the machine, secondary display 219 presents an image of currency of the appropriate denomination for a certain amount of time as is indicated at a step 914. As noted above with reference to FIG. 6, this step is performed by CPU 502 informing CPU 621 of the bill denomination or number of coins inserted. Other images may also be presented. For example, the pay table associated with the inserted denomination may be displayed. After the appropriate information has been displayed at step 914, process control returns to step 908 where display 219 may be updated with appropriate bonus information for example. Alternatively, display 219 may simply revert to the display presented before the bill insertion event at step 912 took place. If no bonus is displayed, then "game attract" mode is entered.

The next event of interest is an error or tilt event as indicated at a step 916. When this occurs, secondary display 219 presents an appropriate machine and tilt message which clearly indicates to the user what has happened, possibly even including a detailed explanation of the specific tilt event. Note that in many prior machines, it was not at all clear to the user that a tilt had occurred because of the limited display capabilities of such prior machines. After the machine displays the tilt message at step 918, the system simply waits for an attendant to show up and rectify the situation as indicated at step 920. After the attendant resets the machine or otherwise corrects the situation, process control returns to step 908 where display 219 is updated as described above.

The third alternative event of interest taking place after step 910 is a play event such as spinning reels as indicated at a step 922. When the reels come to rest, a decision step 924 determines whether or not a winning combination has been presented in the main display. If not, process control simply returns to step 908 where the display 219 is updated as described above. If, on the other hand, the system determines at decision step 924 that the play has resulted in a winning combination, the system must then determine whether the win constitutes a "top pay" at a decision step 926. Such top pay is associated with secondary gaming situations such as those described in more detail below. If the system determines at step 926 that the win does not correspond to a top pay, then secondary display 219 shows an appropriate animation indicating for example, that the machine may be progressing toward a top pay and that continued play may result in a chance at the top pay. After such animation is displayed at a step 930, process control returns to step 908 and the secondary display 219 follows the procedures described above.

Should the system determine at decision step 926 that the win does, in fact, correspond to a top pay, then it may display appropriate celebratory video images in secondary display 219 as indicated at a step 928. For example, secondary display 219 may present a fireworks animation until the pay out is completed, and the machine is reset by an attendant. Thereafter, process control returns to step 908 and the system behaves as described above.

The final event of interest presented in FIG. 9 is an "attract mode" as indicated at a step 932. This event may be triggered by passage of a certain amount of time without one of the first of three events taking place. While in the attract mode, the system may display various attract animations on secondary display 219. For example, it might depict "good luck" balls or other symbols moving around on the screen for a certain amount of time. It may also display spinning reels or some feature designed to attract attention to a particular feature of the game such as a large top award that is available. These various attraction animations may be displayed for a fixed length of time, after which process control returns to step 908 as described above.

Preferably, the system is designed so that secondary display 219 continues behaving in the manner described in FIG.

9 until the power is turned off. That is, the system will remain in one or more loops depicted in FIG. 9 until it is powered off.

Various secondary games will now be described with reference to FIGS. 10-13. Each of these games is designed to supplement a standard slot machine game in which the spinning reels are displayed in the main display. Secondary display 219 is reserved for the supplemental or secondary aspects of the game.

Figure 10:
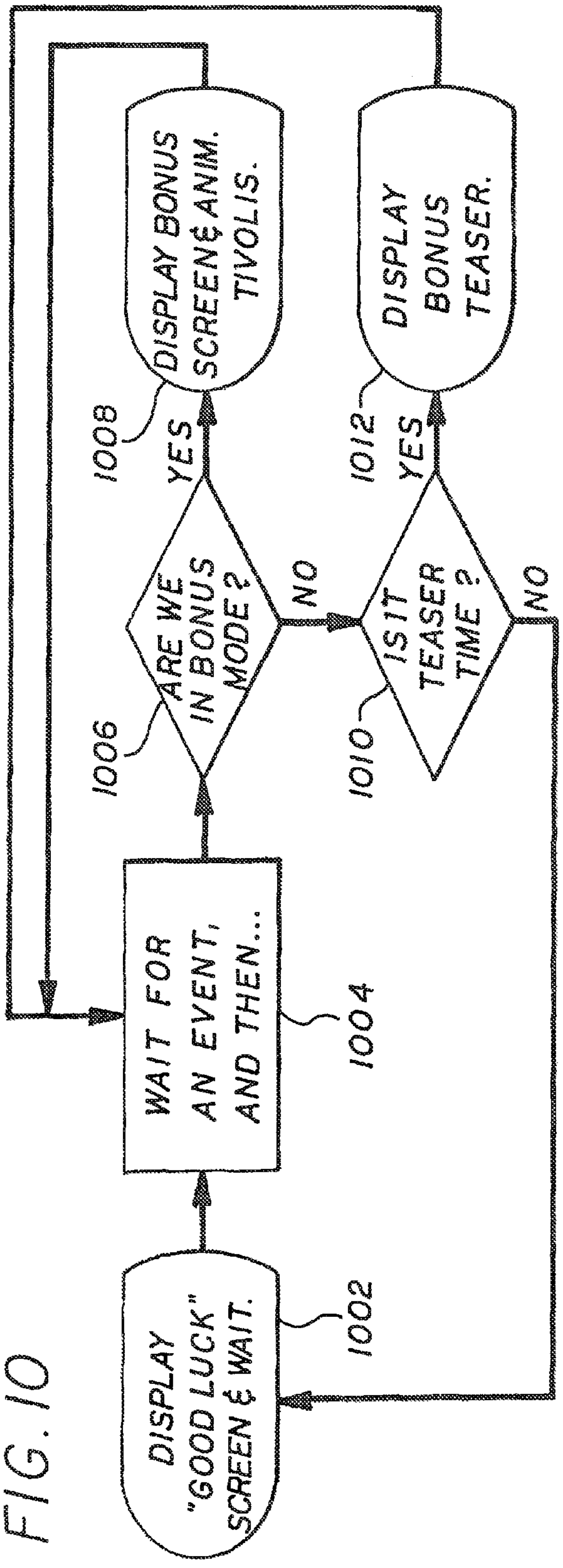
FIG. 10 is a process flow diagram of a specific method for controlling video content associated with one secondary aspect of a game.

The first game of interest is depicted in FIG. 10. This is referred to herein as a "times pay bonus" game. In this game, a player may enter a "window of bonus activity" after a predetermined number of coins have been played (e.g., 100-200 consecutive coins or credits). While in the window, a player may randomly encounter plays in which the pay-out is multiplied beyond the amount on the pay table. Preferably, a system operator can specify both the size of the window (i.e., the number of consecutive plays in which a player remains in the window) and the number of coins needed to reach the window.

While in the window, the system will randomly assign special significance to a certain number of consecutive game plays referred to as a "bonus zone." If while the player is in a zone, he or she obtains a winning combination, then the pay-out associated with that combination is multiplied by a set factor (e.g., 2 to 9). In one preferred embodiment, the operator of the machine can specify such parameters as the size of the zone and the multiplier for any times paid bonus winning combination. As mentioned, the operator may also be able to set the number of coins required to reach a window and the size of the window. Upon the selection of a new setting, the system will automatically adjust the overall pay-out percentage including bonus contribution.

In an alternative embodiment, the number of times play games awarded (e.g., the size of the zone) and the times play multiplier amount may be adjustable depending upon such factors as the time of day, a level of player status, a type of player tracking card inserted, or other specified events. When such adjustments occur, the secondary display will make this clear to the player.

FIG. 10 presents a process flow chart showing how the secondary display screen may handle a "times pay bonus" game. Initially, at a step 1002, secondary display 219 presents custom attract, default attract, and bonus indicator screens intermittently. While in this mode, it continually waits for an event as indicated at a step 1004. When an appropriate event takes place, such as a bill insertion event, the system determines at a decision step 1006 whether it is in bonus mode (i.e., in the zone). If so, secondary display 219 shows a special bonus animation and tivolis (lights dancing around the edge of the screen) This bonus display is illustrated at a step 1008 in the process of FIG. 10. If the event of interest in step 1004 is a winning game play, then the display presented in step 1008 will indicate that the winning combination's pay out is multiplied by the predetermined factor. After the appropriate bonus screen animations are complete, process control returns to step 1004 where the system continues to wait for an appropriate event.

If decision step 1006 determines that the system is not actually in bonus mode, then the system determines at a decision step 1010 whether it is an appropriate time to present a bonus indicator. If not, process controls simply return to step 1002 where an attract message, such as the "good luck" display is presented intermittently. If on the other hand, decision step 1010 determines that a bonus indicator is appropriate, a bonus indicator (e.g., "COMING SOON—TIME PLAY BONUS" with an associated ding sound) is displayed on secondary display 219. After the bonus indicator display is finished, process control returns to step 1004 as described above.

A variation on the "times play bonus" game is a "mystery jackpot bonus" game. A "window" is reached after a predetermined number of coin in events as described above for times play bonus game. Before reaching the window, the system may periodically display a bonus indicator on the secondary display requesting that the player "WATCH FOR THE MYSTERY JACKPOT BONUS." Preferably, this display is accompanied by some unique sound such as a "ding" sound. While in the window, another more frequently displayed attract screen accompanied by two dings tells the player that the bonus is "COMING SOON."

When the mystery jackpot randomly hits within the window, a graphic appears on the secondary screen which indicates that a game play results in the mystery jackpot. The graphic may be, for example, a mystery jackpot logo with multiple question marks pulsating in the background. Upon receipt of a winning play, the system converts the question marks to the amount won and a congratulations statement. An accompanying sound may play when the mystery jackpot is hit.

The game operator may set such parameters as the number of coins needed to reach the window, the size of the window, and the jackpot range. These parameters may also be adjusted via a system automatically depending upon the time of day, a player's tracking card priority, etc. When any parameter is reset, the system automatically recalculates the game percentages.

The next secondary game of interest is a "temperature's rising bonus" game. This game is centered around an image of a thermometer presented in secondary display 219. Initially, the thermometer indicates a relatively low temperature. With each payout from a machine, the temperature in the thermometer rises by a notch. Eventually, when the temperature reaches a maximum value, the next win is accompanied by a bonus such as a large additional pay out or playing credit.

Figure 11:
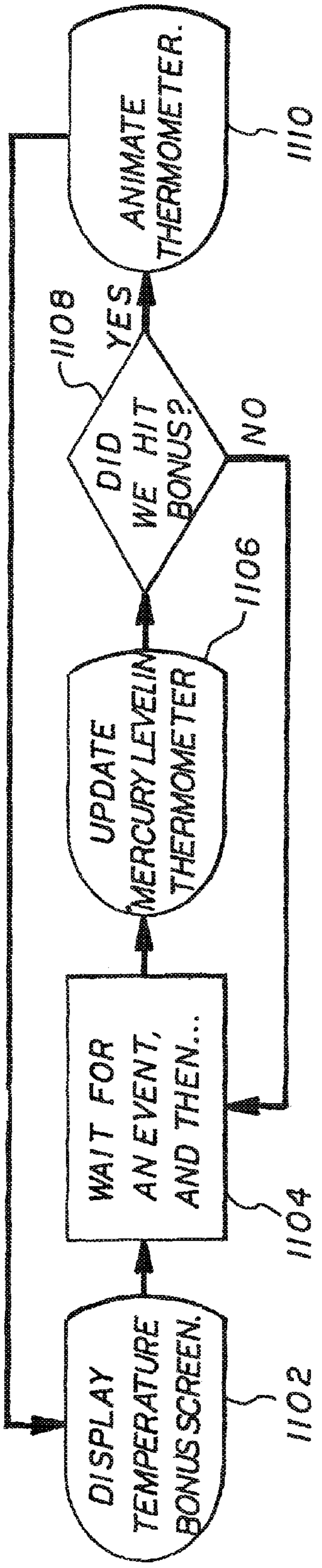
FIG. 11 is a process flow diagram of a specific method for controlling video content associated with an alternative secondary aspect of a game.

The process of controlling the display screen for the temperature's rising bonus game is illustrated in FIG. 11. The process begins at a step 1102 where the system displays a temperature bonus screen (typically a thermometer) on secondary display 219. Next, at a step 1104, the system simply awaits a pertinent event. When such event occurs, the system updates the mercury level in the thermometer at a step 1106. In this case, the event of interest is a win or payout associated with the primary component of the game (e.g., a winning combination on the slot machine reels). As noted, this "update" is illustrated by a mercury level rising in the thermometer by the number of coins won.

After the mercury level has risen, the system determines at a decision step 1108 whether the temperature's rising bonus has been attained. As noted, this corresponds to a certain maximum temperature where the mercury rises to near the top level within the thermometer. Upon reaching such bonus situation (decision step 1108 is answered in the affirmative), the system causes an animated thermometer video to be displayed on the video display screen at a step 1110. This may involve, for example, the mercury exploding out of the thermometer and showering money. Appropriate sound may be provided as well. If decision step 1108 is answered in the negative (the mercury update was not associated with a bonus), then process control simply returns to step 1104 where the system awaits an appropriate event.

After payout, the system will normally reset to the lowest possible temperature. If the final number of bonus degrees awarded is greater than the target number of degrees needed for the bonus, the player receives the bonus and the game resets so that the new value (temperature) is equal to the remainder degrees awarded that exceeded the target number of degrees needed. For example, if the game is at 1900 degrees and 2000 degrees is the bonus temperature, and the play awards 200 more degrees, the game will reset with 100 degrees showing on the thermometer.

In a preferred embodiment, the operator will be able to set the number of coin-out points (degrees) needed to win and the bonus win amount. The machine will automatically calculate the game percentages based upon the operator's parameters set. In addition, certain events such as insertion of a player tracking card of a particular priority or the time of day will automatically cause these parameters to reset. The changed parameter may be specified on the secondary display by flashing the new amount when the card is inserted, for example.

Figure 12A:
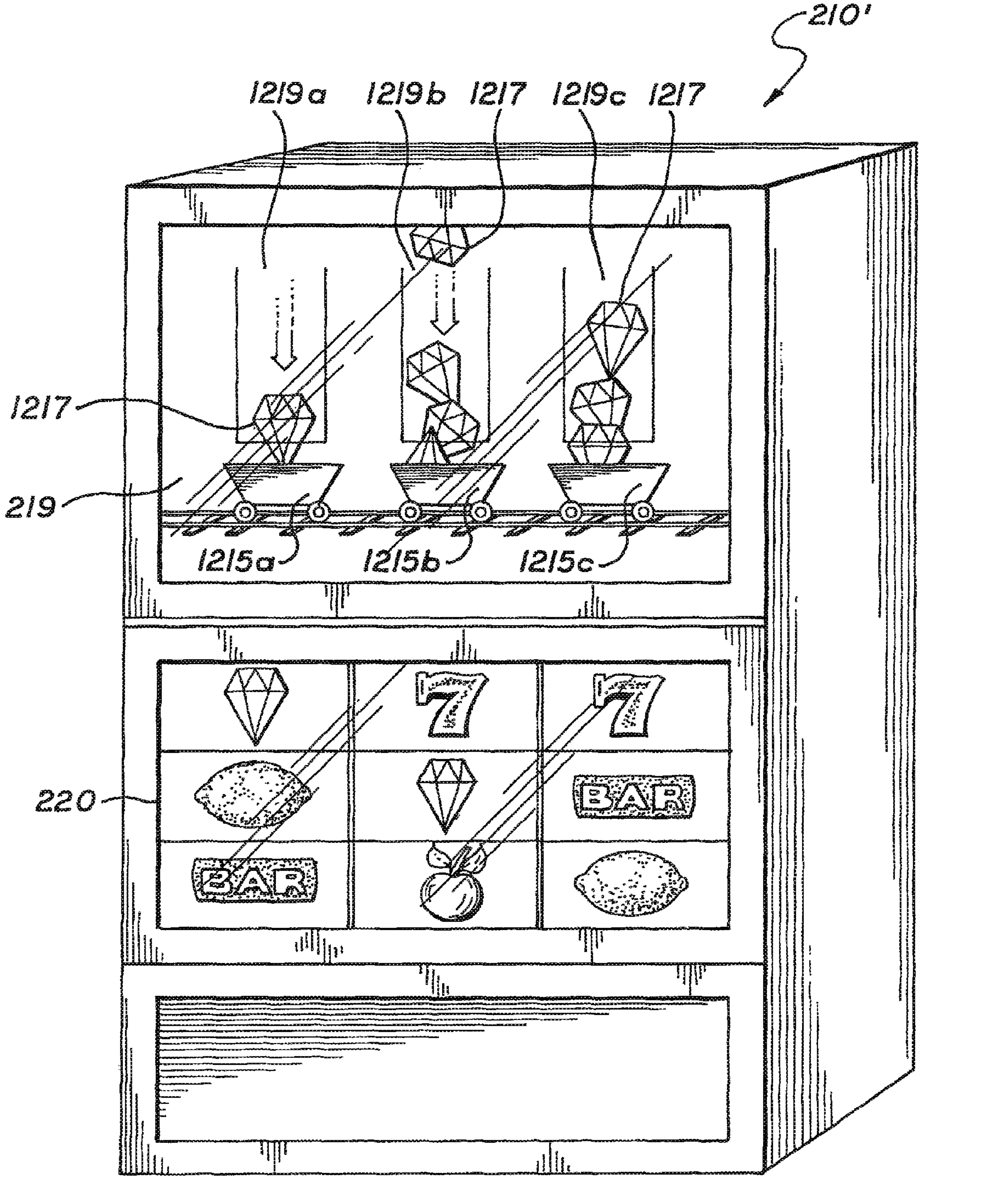
FIG. 12A is an illustration of a slot machine of this invention including main and secondary displays illustrating the play of a "diamond mine" bonus game.
Figure 12B:
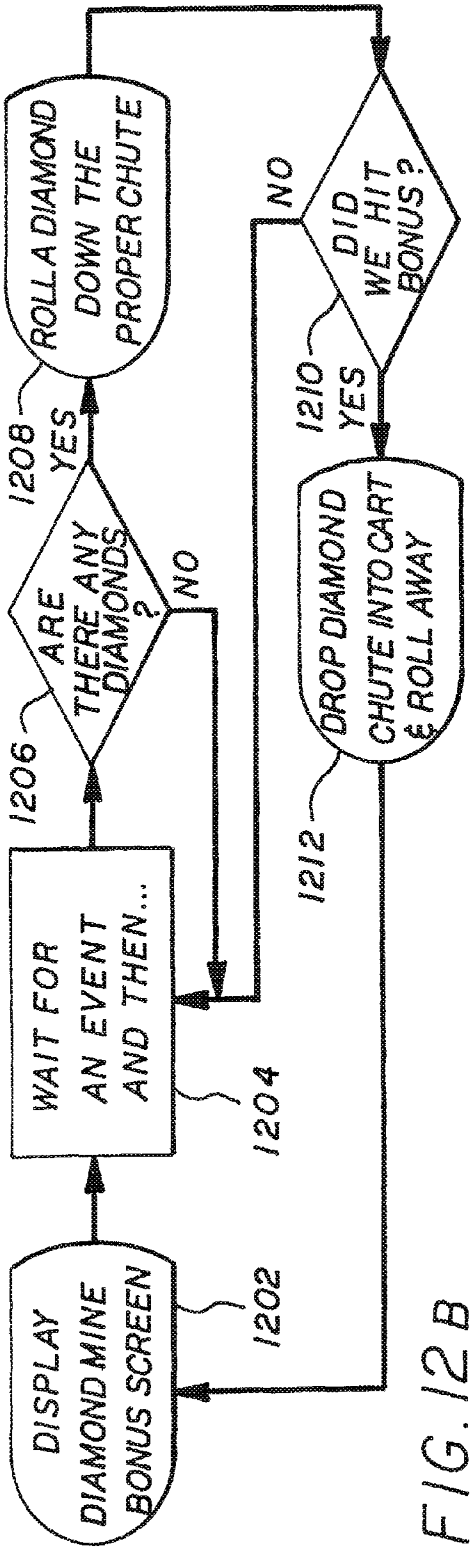
FIG. 12B is a process flow diagram of a specific method for controlling video content associated with the "diamond mine" bonus game.

The next secondary game of interest is referred to herein as a "double diamond mine bonus" game as depicted in FIGS. 12A and 12B. In this game, the secondary display screen 219 depicts three carts 1215*a*, 1215*b*, and 1215*c* for carrying diamonds 1217. It also depicts three chutes 1219*a*, 1219*b*, and 1219*c* above the three carts for storing the diamonds 1217. Each of these three cart/chute combinations corresponds to one of the three reels of main display 220. Any time that a diamond appears on any reel of the slot machine, a diamond icon is delivered to the chute corresponding to that reel. The object of the game is to fill any given chute with a certain maximum number of diamonds such as 9 diamonds. When this situation occurs, an extra payout or credit is given to the player.

As illustrated in FIG. 12B, the system controls secondary display 219 during a double diamond mine bonus game according to a defined process flow. The system initially displays a diamond mine bonus screen indicating that the player is in the bonus mode (see step 1202). Thereafter, the system simply waits for the appropriate event which is the result of a slot machine play as indicated at a step 1204. Next, the system determines whether there are any diamonds on any of the reels at the end of that play at a step 1206. If not, process control simply returns to step 1204 where the system waits for the next play. If on the other hand, the system determines at decision step 1206 that there was in fact one or more diamonds displayed in the main display, then a diamond is rolled down the proper chute as depicted on secondary display 219 in a step 1208.

Next, the system must determine at a step 1210 whether the player has hit a bonus. As indicated above, this occurs when any chute has a certain number of diamonds. Assuming that the user has hit a bonus (decision step 1210 is answered in the affirmative), secondary display 219 depicts all of the diamonds in the chute associated with the diamond chute dropping into the cart and rolling away as indicated at a step 1212. Thereafter, process control returns to step 1202. If decision 1210 is answered in the negative (a bonus was not hit when a diamond appeared in a reel), process control is simply returned to step 1204 where the system waits for the next event.

Figure 13B:
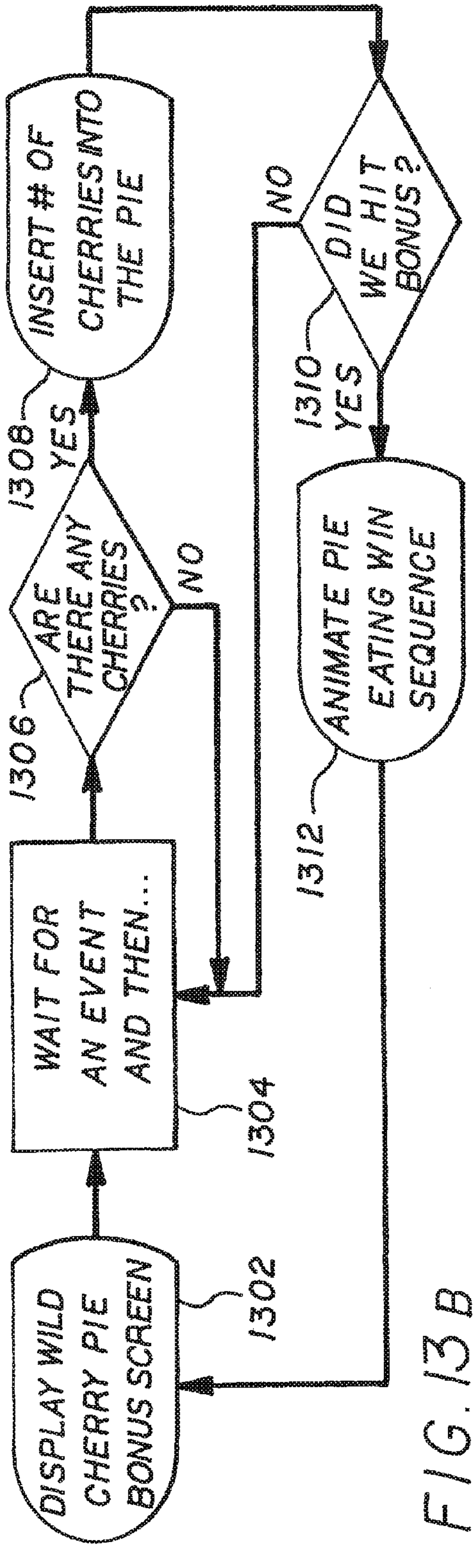
FIG. 13B is a process flow diagram of a specific method for controlling video content associated with the "cherry pie" bonus game.
Figure 13A:
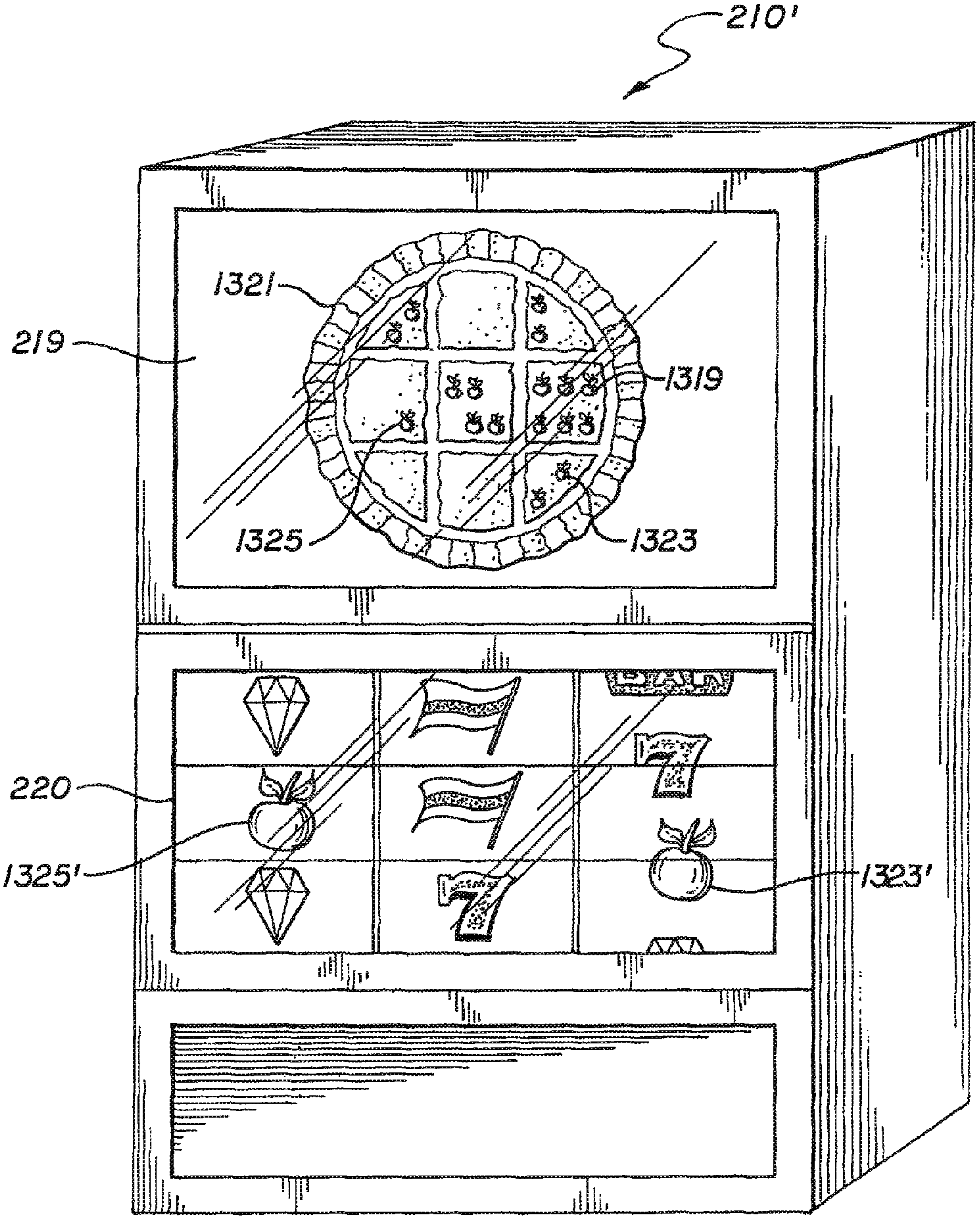
FIG. 13A is an illustration of a slot machine of this invention including main and secondary displays illustrating the play of a "cherry pie" bonus game.

A related but slightly more involved game is a "wild cherry pie" game as illustrated in FIG. 13A. This game provides a bonus when a cherry pie 1321 (displayed on the secondary screen) is completely filled with cherries 1319. In a preferred embodiment, the pie contains nine sections, each having space for six cherries. When the nine sections are each filled with six cherries, the bonus is awarded.

A cherry is added to the appropriate pie section every time a cherry symbol appears on the slot machine display. The cherry may appear on any of three slot machine reels and may appear above, below, or on the pay line. This defines nine sectors corresponding to regions of the pie: left reel top, middle, and bottom, center reel top, middle, and bottom, and right reel top, middle, and bottom. For example, when a cherry symbol 1323' appears below the pay line of the right reel, then a cherry 1323 is placed in the corresponding right bottom sector of the displayed cherry pie 1321. Similarly, if a cherry symbol 1325' appears on the left reel pay line, a cherry 1325 is placed in the middle left sector of the displayed pie. In a preferred embodiment, the number of coins wagered on a particular game will increase the award of cherries. For example, if three coins are wagered, and a cherry appears on the payline of the center reel, three cherries will be added to the corresponding pie sector. In this manner, the player can increase the speed at which cherries are accumulated.

When a cherry is added, the corresponding sound and graphic will be presented simultaneously. If there is a winning combination on the reels that contain a cherry, the win amount will roll up on. a win meter and then the cherry will be added to the pie.

The process flow for the wild cherry pie game is detailed in FIG. 13B. This process begins at a step 1302 where a wild cherry pie bonus screen is displayed on the secondary display to entice the players. The bonus screen may be a cherry pie—initially without cherries. At a step 1304, the system registers a game play event. Next, at a step 1306, the system determines whether there are any cherries displayed on the reels. If not, process control returns to step 1304. If so, the system inserts cherries into the pie at locations corresponding to the reels/pay line in which the cherries appeared. This is represented by a process step 1308.

After the cherries have been inserted into the pie, a decision step 1310 determines whether the system has hit a bonus (i.e., the pie is filled with cherries). If not, process control returns to step 1304. If so, the system animates a pie eating sequence on the secondary display at a step 1312. After all the cherries have been "eaten," the jackpot amount is revealed on the pie tin.

If there is a winning combination on the reels that contain one or more cherries, and the pie is filled, then first the win amount from the reels will roll up on the win meter, second the cherry or cherries will be added to the pie and a "pie eating" sequence will animate, and finally the amount shown as won on the pie tin will be added to the win meter. Preferably, the game will not reset until the next game is initiated by a reel spin.

Another related game displays "racing sevens" (or some other symbol on the slot machine reels) on the secondary display. There is one racing seven and one associated race track lane for each color seven on the slot machine. Thus, there will typically be three racing sevens. In a specific example, there are red sevens, white sevens, and blue sevens on the three reels. When a seven appears on the payline, the colored seven in the corresponding race track lane will race ahead by a distance depending upon the number of coins played. If one coin is played, the seven races ahead by one increment, if two coins are played, the seven races ahead by two increments, etc. Preferably, the racing movement is accompanied by an engine revving sound.

When one of the sevens reaches the end of the race track, a bonus is paid. In one specific embodiment, the sevens must increment thirty times (e.g., thirty coins). Further, the bonus may be made to depend upon which seven wins the race. In a specific embodiment, the bonus amount is ten coins for a blue victory, twenty-five coins for a white victory, and two hundred coins for a red victory.

If a particular seven advances two more times during the same game (because two or more coins are being played), the second and third seven will be displayed as a "ghosted" trail behind the first seven until the next game is played. Once a spin is actuated for the next game, the ghosted sevens will disappear into the first seven.

If there is a winning combination on the reels that contain sevens, and the race is won, then (1) the win amount from the reels will roll up on the win meter, (2) the sevens will increment and a race won sequence will animate, and (3) the amount won from the race will be added to the win meter.

Any of the above bonus games could be played with an additional option of the type employed in IGT's "Wheel of Fortune" games. In these games, the slot machine is equipped with a "bonus wheel." In some cases, the player must spin (or otherwise actuate) the wheel to determine the jackpot award. In other cases, the player has the opportunity to choose to spin after specifically identified combinations appear on the payline. A spin of the wheel allows the player to increase or decrease the payout defined on the machine paytables. If the wheel stops on a sector having an increased payout, the player's winnings are increased over the value displayed on the pay table. If the wheel stops on a sector having a decreased payout, the player's winnings are reduced by an amount specified on the sector. On average, over many plays, the payout should equal the amount specified by the pay table. However, any given payout may be increased or decreased according the to the wheel spin. The wheel may be provided as a mechanically spinning feature visible from the slot machine exterior. Alternatively, it may be displayed on secondary display 219 or some other display provided on the system.

In the above-described bonus games, the bonus award can be increased or decreased depending upon a wheel spin by the player. Thus, for example, should the player win a times pay bonus as described above, he or she could increase the value of the associated award by spinning a wheel. For example, the multiplier amount could be increased or decreased depending upon the wheel sector selected at the end of the spin. In some bonus games, the additional wheel spin may be made mandatory. In others, it could be played at the option of the player.

Although the foregoing invention has been described in some detail for purposes of clarity of understanding, it will be apparent that certain changes and modifications may be practiced within the scope of the appended claims. For instance, while the gaming machines of this invention have been depicted as having up-right structures (i.e., the displays are vertically aligned), the use of video displays in accordance with this invention is not so limited. For example, the main and/or secondary displays may be provided in a "slant top" machine in which the displays are aligned at an angle between the vertical and horizontal. The invention may also be employed with a "bar table" design in which one or more displays is provided in a horizontal table or counter top. Further, touchscreen LCD panels may be utilized to increase the functionality of the secondary display and to simplify use for the player.

The invention claimed is:

1. A gaming machine comprising:

a chassis defining a gaming machine interior region and a gaming machine exterior surface;

a gaming machine controller for controlling the outcome of a primary game played on the gaming machine;

a main display capable of presenting the outcome of the primary game on the gaming machine;

a microphone;

a secondary display, which is a flat panel display configured to display video content, provided on the gaming machine at a location disposed apart from the main display and configured to provide a menu including a plurality of options for an audio selection of one of the options by a player, to be communicated as a request via the menu of the secondary display to an entity capable of responding to the request; and a secondary display support on which the secondary display is mounted, the secondary display support being attached to the chassis by a hinge.

2. The gaming machine of claim 1, wherein the hinge allows the secondary display to be moved from (i) an operating position in which at least a portion of the gaming machine interior is blocked to (ii) a maintenance position in which the portion is accessible.

3. The gaming machine of claim 2, wherein the secondary display is provided in a top box portion of the gaming machine, which top box portion is located above a main display portion of the gaming machine.

4. The gaming machine of claim 1, wherein the secondary display is provided in a belly portion of the gaming machine, which belly portion is located below a main display portion of the gaming machine.

5. The gaming machine of claim 1, wherein the secondary display is selected from the group consisting of flat panel cathode ray tubes, liquid crystal displays, plasma displays, field emission displays, digital micromirror displays, LCD touchscreens, and combinations thereof.

6. The gaming machine of claim 1, wherein the main display comprises a set of spinning reels.

7. The gaming machine of claim 1, wherein the video content includes material selected from the group consisting of a casino kiosk, television programming, a secondary game, primary game outcome information, player attraction material, video conferencing, casino service notification and combinations thereof.

8. The gaming machine of claim 7, wherein the video content is a secondary game which includes a bonusing component to a primary game, which primary game has its results displayed on the main display.

9. The gaming machine of claim 1, further comprising one or more speakers provided in the gaming machine and one or more ports for transmitting sound from the speakers to locations outside of the gaming machine.

10. The gaming machine of claim 1, wherein the secondary display support includes a casing which encloses one or more memory devices.

11. The gaming machine of claim 10, wherein at least one of the memory devices stores animation data for display on the secondary display.

12. The gaming machine of claim 1, further comprising a top glass located in front of the secondary display and the secondary display support.

13. The gaming machine of claim 1, wherein the entity is selected from the group consisting of: a casino attendant, a further player, an individual, and a further gaming machine.

14. The gaming machine of claim 1, wherein the request is selected from the plurality of options, the plurality of options consisting of: a request for a car reservation, a drink request, a request for a movie reservation, a request for dinner, a request for a theater, a request to leave a message, and a request for a taxi service.

15. The gaming machine of claim 1, wherein the entity is configured to communicate information to the gaming machine in response to the request.

16. The gaming machine of claim 1, wherein the secondary display is configured to provide two-way communication between the player and the entity.

17. A method of displaying video content on a gaming machine having (i) a main display capable of presenting the outcome of a primary game play on the gaming machine, and (ii) a secondary display, which is a flat panel video display mounted on a secondary display support and is configured to display video content, provided on the gaming machine at a location disposed apart from the main display, the method comprising:

receiving a wager;

in response to a player initiating a play on the gaming machine, presenting the outcome of the play of the primary game on the main display of the gaming machine;

providing at the secondary display a menu including a plurality of options for an audio selection of one of the options by a player, to be communicated as a request via the menu of the secondary display to an entity capable of responding to the request; and moving the secondary display support from an operating position in which at least a portion of a gaming machine interior is blocked to a maintenance position in which the portion is accessible.

18. The method of claim 17, wherein the video content comprises material selected from the group consisting of a casino kiosk, television programming, a secondary game, player attraction material, video conferencing, casino services notification and combinations thereof.

19. The method of claim 17, wherein the video content is a bonusing game that provides awards dependent upon the outcome of the primary game play which has its outcome displayed on the main display.

20. The method of claim 19, wherein the bonusing game results in awards of credits or increased jackpots.

21. The method of claim 17, wherein the secondary display employed in the step of displaying video content is selected from the group consisting of flat panel cathode ray tubes, liquid crystal displays, plasma displays, field emission displays, digital micromirror displays, LCD touchscreens, and combinations thereof.

22. The method of claim 17, wherein presenting the results of a play on the main display is made in response to a play on a game selected from the group consisting of a video slot game, a spinning reel game, an electronic video poker card game, an electronic keno game, and an electronic blackjack game.

23. The method of claim 17, wherein presenting the results of a play on the main display is made in response to a play on a video card game.

24. The method of claim 17, further comprising a step of accessing data stored on a memory device provided within the secondary display support, the accessed data being used to display the video content on the secondary display.

25. A gaming machine comprising:

a chassis defining a gaming machine interior region and a gaming machine exterior surface;

a gaming machine controller for controlling the outcome of a primary game played on the gaming machine;

a main display capable of presenting the outcome of the primary game on the gaming machine;

a secondary display, which is a flat panel display, provided on the gaming machine at a location disposed apart from the main display and configured to provide a menu including a plurality of options for an audio selection of one of the options by a player, to be communicated as a request via the menu of the display to an entity capable of responding to the request; and a secondary display support on which the secondary display is mounted, the secondary display support being attached to the chassis by a hinge.

26. The gaming machine of claim 25, wherein the hinge allows the secondary display to be moved from (i) an operating position in which at least a portion of the gaming machine interior is blocked to (ii) a maintenance position in which the portion is accessible.

27. A gaming machine comprising:

a chassis defining a gaming machine interior region and a gaming machine exterior surface;

a gaming machine controller for controlling the outcome of a game played on the gaming machine;

a display configured to provide a menu including a plurality of options for an audio selection of one of the options by a player, to be communicated as a request via the menu of the display to an entity capable of responding to the request; and a display support on which the display is mounted, the display support being attached to the chassis by a hinge.

28. The gaming machine of claim 27, wherein the hinge allows the display to be moved from (i) an operating position in which at least a portion of the gaming machine interior is blocked to (ii) a maintenance position in which the portion is accessible.

* * * * *